United States Patent
Liu et al.

(10) Patent No.: US 11,332,613 B2
(45) Date of Patent: May 17, 2022

(54) POLYCARBONATE COMPOSITIONS, METHODS OF MANUFACTURE, AND METHODS OF USE

(71) Applicant: SABIC GLOBAL TECHNOLOGIES B.V., Bergen op Zoom (NL)

(72) Inventors: Xing Liu, Shanghai (CN); Wei Shan, Shanghai (CN); Yaming Niu, Shanghai (CN); Ying Na, Shanghai (CN); Hongmei Zhou, Shanghai (CN); Rahul Patil, Evansville, IN (US); Yusuf Sulub, Newburg, IN (US); Pooja Bajaj, Schenectady, NY (US); Wei Zhao, Evansville, IN (US); Peter Vollenberg, Mt. Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 103 days.

(21) Appl. No.: 16/490,334

(22) PCT Filed: Aug. 16, 2018

(86) PCT No.: PCT/IB2018/056197
§ 371 (c)(1),
(2) Date: Aug. 30, 2019

(87) PCT Pub. No.: WO2019/130081
PCT Pub. Date: Jul. 4, 2019

(65) Prior Publication Data
US 2021/0403704 A1   Dec. 30, 2021

Related U.S. Application Data

(60) Provisional application No. 62/717,508, filed on Aug. 10, 2018, provisional application No. 62/611,753, filed on Dec. 29, 2017, provisional application No. 62/611,767, filed on Dec. 29, 2017.

(51) Int. Cl.
| | | |
|---|---|---|
| *C08L 69/00* | (2006.01) | |
| *C08L 53/00* | (2006.01) | |
| *C08L 83/04* | (2006.01) | |
| *B29C 48/00* | (2019.01) | |
| *C08F 120/14* | (2006.01) | |
| *C08G 64/10* | (2006.01) | |
| *C08G 64/18* | (2006.01) | |
| *C08L 23/16* | (2006.01) | |
| *C08L 25/12* | (2006.01) | |
| *C08L 27/18* | (2006.01) | |

(52) U.S. Cl.
CPC ............ *C08L 69/00* (2013.01); *B29C 48/022* (2019.02); *C08F 120/14* (2013.01); *C08G 64/10* (2013.01); *C08G 64/186* (2013.01); *C08L 23/16* (2013.01); *C08L 25/12* (2013.01); *C08L 27/18* (2013.01); *C08L 53/00* (2013.01); *C08L 83/04* (2013.01); *C08L 2201/08* (2013.01); *C08L 2203/20* (2013.01); *C08L 2203/30* (2013.01); *C08L 2205/02* (2013.01); *C08L 2205/035* (2013.01); *C08L 2205/22* (2013.01); *C08L 2207/53* (2013.01)

(58) Field of Classification Search
CPC .... C08L 53/02; C08L 53/025; C08L 2205/03; C08L 2205/035; C08L 2207/53; C08L 69/00
See application file for complete search history.

(56) References Cited

U.S. PATENT DOCUMENTS

2018/0223098 A1 *  8/2018  Inazawa .................. C08L 53/02

FOREIGN PATENT DOCUMENTS

| WO | 2015106208 A1 | 7/2015 |
| WO | 2017033783 A1 | 6/2018 |

OTHER PUBLICATIONS

International Search Report for International Application No. PCT/IB18/56197; International Filing Date Aug. 16, 2018, dated Nov. 14, 2018, 5 pages.
Written Opinion for International Application No. PCT/IB18/56197, International Filing Date Aug. 16, 2018, dated Nov. 14, 2018, 7 pages.
International Preliminary Report on Patentability for International Application No. PCT/IB2018/056197, International Filing Date Aug. 16, 2018, dated Jul. 9, 2020, 6 pages.

* cited by examiner

*Primary Examiner* — Jeffrey C Mullis
(74) *Attorney, Agent, or Firm* — Cantor Colburn LLP

(57) ABSTRACT

A polycarbonate composition includes: a continuous polycarbonate phase; discontinuous first domains distributed in the continuous phase, and comprising a core-shell silicone-(meth)acrylate impact modifier comprising a silicone elastomer core and a (meth)acrylate copolymer shell, wherein the first domains have an aspect ratio of at least 1.7, preferably at least 1.8; and discontinuous second domains distributed in the continuous phase, and comprising an alkenyl aromatic-olefin block copolymer impact modifier, wherein the second domains have an aspect ratio of at least 3, preferably at least 4, and a domain size of 6400 square nanometers or less, more preferably 5700 square nanometers or less. Optionally, the polycarbonate composition includes: a polycarbonate; a brominated polycarbonate different from the polycarbonate; a poly(carbonate-siloxane) comprising 30 to 70 weight percent of siloxane blocks; a core-shell silicone-(meth)acrylate impact modifier comprising a silicone elastomer core and an (meth)acrylate copolymer shell; and an alkenyl aromatic-olefin block copolymer impact modifier.

20 Claims, 3 Drawing Sheets

POLYCARBONATE COMPOSITIONS, METHODS OF MANUFACTURE, AND METHODS OF USE

CROSS REFERENCE TO RELATED APPLICATIONS

This application is a National Stage application of PCT/IB2018/056197, filed Aug. 16, 2018, the entire contents of which are incorporated by reference herein, which claims the benefit of US Provisional Appl. Ser. No. 62/717,508, filed Aug. 10, 2018, and the benefit of US Provisional Appl. Ser. No. 62/611,767, filed Dec. 29, 2017, and the benefit of US Provisional Appl. Ser. No. 62/611,753, filed Dec. 29, 2017.

BACKGROUND

This disclosure relates to polycarbonate compositions with enhanced properties.

Polycarbonates are useful in a wide variety of applications at least in part because of their good balance of properties, such as moldability, heat resistance, and impact properties, among others. Because of their broad use, particularly in the electrical and electronic industries, it is desirable to provide polycarbonate copolymer thermoplastic compositions with enhanced hydrolytic performance, good electrical tracking resistance, flame retardant performance, and low-temperature impact properties. There accordingly remains a need in the art for polycarbonate copolymer compositions that have enhanced hydrolytic stability and low temperature impact performance. It would be a further advantage if the compositions had good electrical tracking performance without a significant detrimental effect on one or more of impact performance and flame retardant performance.

BRIEF DESCRIPTION

In an embodiment, a polycarbonate composition comprises: a continuous phase comprising a polycarbonate component; discontinuous first domains distributed in the continuous phase, and comprising a core-shell silicone-(meth)acrylate impact modifier comprising a silicone elastomer core and a (meth)acrylate copolymer shell, wherein the first domains have an aspect ratio of at least 1.7, preferably at least 1.8; and discontinuous second domains distributed in the continuous phase, and comprising an alkenyl aromatic-olefin block copolymer impact modifier, wherein the second domains have an aspect ratio of at least 3, preferably at least 4, and a domain size of 6400 square nanometers or less, more preferably 5700 square nanometers or less, each as determined by scanning transmission electron microscopy of an outer surface of a molded sample, within 10 micrometers of the outer surface.

In another embodiment, a polycarbonate composition includes: 60 to 80 weight percent of a polycarbonate; 10 to 30 weight percent of a brominated polycarbonate different from the polycarbonate; 0.5 to 5 weight percent of a poly(carbonate-siloxane) comprising 30 to 70 weight percent of siloxane blocks; 1 to 10 weight percent of a core-shell silicone-(meth)acrylate impact modifier comprising a silicone elastomer core and an MMA copolymer shell; and 0.5 to 5 weight percent of an alkenyl aromatic-olefin block copolymer impact modifier; wherein the weight percent of each component is based on the total weight of the composition, which totals 100 weight percent.

In another embodiment, an article comprises the above-described polycarbonate composition, wherein the article is a molded article, a thermoformed article, an extruded film, an extruded sheet, one or more layers of a multi-layer article, a substrate for a coated article, or a substrate for a metallized article.

In yet another embodiment, a method of manufacture of an article comprises molding, extruding, casting, or shaping the above-described polycarbonate composition into an article.

The above described and other features are exemplified by the following Detailed Figures, Description, Examples, and Claims.

BRIEF DESCRIPTION OF THE DRAWINGS

FIG. 2A is an image analysis output representation of FIG. 2B, which is a STEM morphological images at 30,000 magnification.

FIG. 3A is an image analysis output representation of FIG. 3B, which is a STEM morphological images at 30,000 magnification.

DETAILED DESCRIPTION

Figure 1A:
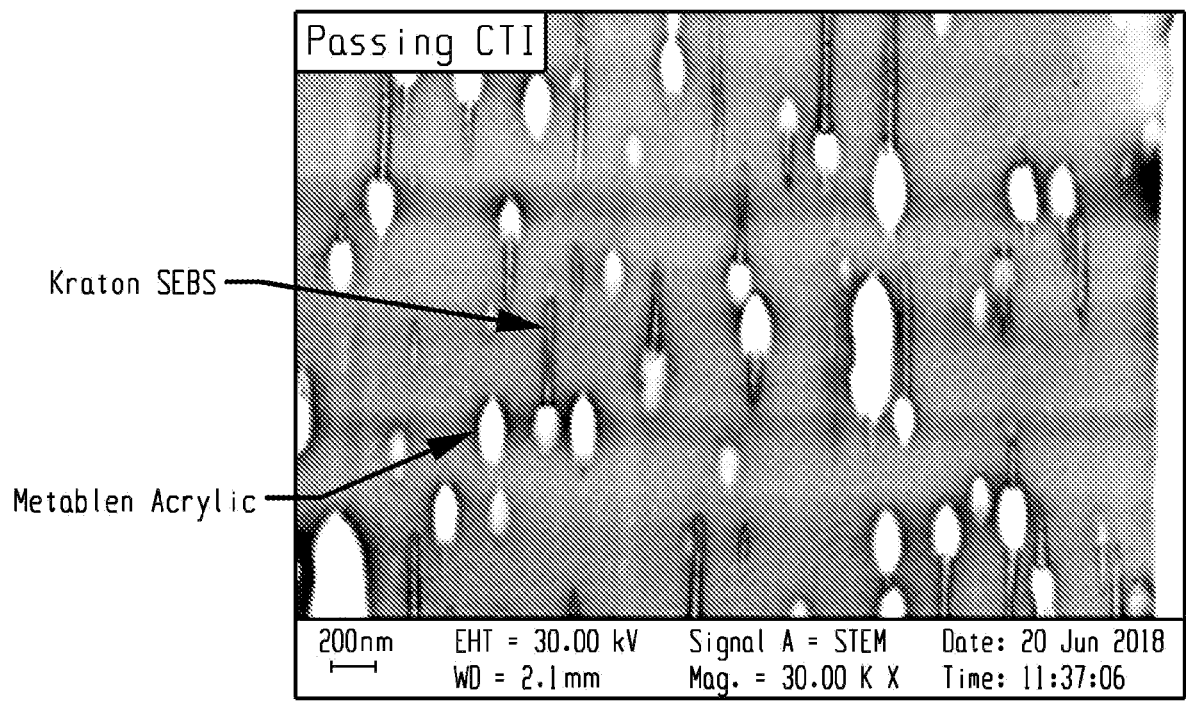
FIG. 1A and FIG. 1B are STEM morphological images at 30,000 magnification of a molded plaque with a passing CTI (FIG. 1A) and a molded plaque that fails CTI (FIG. 1B).

Provided herein are polycarbonate compositions that include a continuous polycarbonate phase, and first and second continuous domains of a specific size. The first domains include a first impact modifier, in particular core-shell silicone-(meth)acrylate impact modifier comprising a silicone elastomer core and a (meth)acrylate copolymer shell; and the second domains include a second impact modifier, in particular an alkenyl aromatic-olefin block copolymer impact modifier. Compositions with this morphology can have excellent electrical tracking resistance and good low temperature impact properties.

Further provided herein are polycarbonate compositions having an advantageous balance of improved low-temperature impact performance and hydrolytic stability. The compositions can further have good electrical tracking performance or flame retardance, or both. The properties can unexpectedly be obtained by a composition including a polycarbonate, a brominated polycarbonate different from the polycarbonate, a poly(carbonate-siloxane) elastomer, a silicon-based impact modifier, and an alkenyl aromatic-olefin block copolymer impact modifier, can result in a significant improvement in electrical tracking resistance of the polycarbonate compositions. The results are surprising because other polycarbonate compositions cannot meet high-end (1500-Volt) application requirements with respect to electrical tracking without significant losses in low-temperature impact performance and flame retardance.

Also provided herein are polycarbonate compositions having improved electrical tracking performance. The improved electrical tracking performance can be obtained without compromising low temperature impact properties, electrical performance properties, and flame retardance. In an embodiment, desirable flow properties can further be obtained. The properties can unexpectedly be obtained by a composition including a polycarbonate, a brominated polycarbonate, a poly(carbonate-siloxane) elastomer, a core-shell silicone-(meth)acrylate impact modifier, an alkenyl aromatic-olefin block copolymer impact modifier, and an anti-drip agent. In an embodiment, compositions including a polycarbonate, a brominated polycarbonate, a poly(carbonate-siloxane) elastomer, a silicon-based impact modifier, and an alkenyl aromatic-olefin block copolymer impact modifier, can result in improved low-temperature impact performance and/or flame retardance. The results are surprising because other polycarbonate compositions do not meet high-end (1500-Volt) application requirements with respect to electrical tracking without significant losses in low-temperature impact performance and flame retardance.

As stated above, the polycarbonate compositions comprise a polycarbonate component. The polycarbonate component can include a polycarbonate and a brominated polycarbonate different from the polycarbonate, as well as a poly(carbonate-siloxane).

"Polycarbonate" as used herein means a homopolymer or copolymer having repeating carbonate units of formula (1)

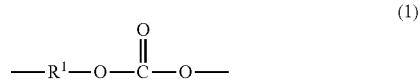

wherein at least 60 percent of the total number of $R^1$ groups is aromatic, or each $R^1$ contains at least one $C_{6-30}$ aromatic group. A combination of different $R^1$ groups can be present. The carbonate units can be derived from a dihydroxy compound such as an aromatic dihydroxy compound of formula (2) or a bisphenol of formula (3)

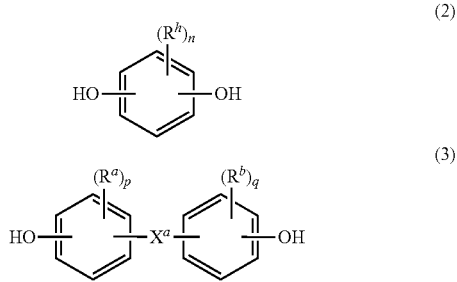

wherein in formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4; and in formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen.

In an embodiment in formulas (2) and (3), $R^a$ and $R^b$ are each independently $C_{1-3}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In still other embodiments in formulas (2) and (3), p and q is each 0, or p and q is each 1, and $R^a$ and $R^b$ are each a $C_{1-3}$ alkyl group, preferably methyl, disposed meta to the hydroxy group on each arylene group; $X^a$ is a bridging group connecting the two hydroxy-substituted aromatic groups, where the bridging group and the hydroxy substituent of each $C_6$ arylene group are disposed para to each other on the $C_6$ arylene group, and $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkylene, $C_{1-12}$ heteroalkyl, or cyclic $C_{7-12}$ heteroarylalkylene; or a group of the formula —C(=$R^e$)— wherein $R^e$ is a divalent $C_{1-12}$ hydrocarbon group.

Examples of diphenols (2) included resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, or 2,4,5,6-tetrabromo resorcinol; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, or 2,3,5,6-tetrabromo hydroquinone. A combination comprising different diphenol compounds can be used.

Examples of bisphenols (3) include those listed for example, in WO 2013/175448 A1 and WO 2014/072923 A1. A combination comprising different bisphenol compounds can be used. Specific dihydroxy compounds include resorcinol, 2,2-bis(4-hydroxyphenyl) propane (bisphenol A or BPA), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane, and 1,1-bis(4-hydroxyphenyl)-3,3,5-trimethylcyclohexane (TMC bisphenol).

In more preferred embodiment, the bisphenol polycarbonate is a bisphenol A polycarbonate homopolymer, also referred to as bisphenol A homopolycarbonate, which has repeating structural carbonate units of formula (1a).

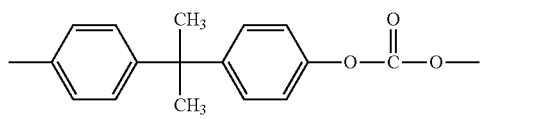

Such linear homopolymers containing bisphenol A carbonate units (BPA-PC) include those commercially available under the trade name LEXAN from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN CFR from SABIC.

Polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_1$-$C_{22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 weight percent (wt %). Combinations comprising linear polycarbonates and branched polycarbonates can be used.

An end-capping agent can be included during polymerization to provide end groups. The end-capping agent (and thus end group) is selected based on the desired properties of the polycarbonates. Exemplary end-capping agents are exemplified by monocyclic phenols such as phenol and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with $C_{8-9}$ branched chain alkyl substituents, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, ($C_1$-$C_{22}$ alkyl)-substituted benzoyl chlorides, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. A combination of different end groups can be used.

In an embodiment, the polycarbonate is a bisphenol A homopolycarbonate having a weight average molecular weight of 10,000 to 100,000 Daltons (Da), or 15,000 to 50,000 Da, or 17,000 to 35,000 Da, as measured by gel permeation chromatography (GPC), using a crosslinked styrene-divinylbenzene column and calibrated to bisphenol A homopolycarbonate references. GPC samples can be prepared at a concentration of 1 mg per ml, and are eluted at a flow rate of 1.5 ml per minute. More than one bisphenol A homopolycarbonate can be present. For example, the polycarbonate compositions can comprise a first bisphenol A homopolycarbonate having a weight average molecular weight of 15,000 to 25,000 Da or 17,000 to 23,000 Da or 18,000 to 22,000 Da, or 21,000 to 23,000 Da as measured by GPC using bisphenol A polycarbonate standards; and a second bisphenol A homopolycarbonate having a weight average molecular weight of 26,000 to 40,000 Da or 26,000 to 35,000 Da, or 28,000 to 31,000 Da, each measured by GPC using bisphenol A polycarbonate standards. The weight ratio of the first bisphenol A homopolycarbonate relative to the second bisphenol A homopolycarbonate can be 10:1 to 1:10, or 5:1 to 1:5, or 3:1 to 1:3, or 2:1 to 1:2. In another embodiment, the polycarbonate comprises a first bisphenol A homopolycarbonate having a weight average molecular weight of 19,000 to 26,000 Da, or 20,000 to 25,000, more preferably 21,000 to 23,000 Da, and a second bisphenol A homopolycarbonate having a weight average molecular weight of 28,000 to 35,000 Da, or 29,000 to 32,000 Da, more preferably 29,000 to 31,000 Da. In any of the foregoing embodiments, the first bisphenol A homopolycarbonate can be present in an amount of 15 to 45 wt %, or 15 to 35 wt %, or 15 to 25 wt %, based on the total weight of the composition and the second bisphenol A homopolycarbonate can be present in an amount of 40 to 70 wt %, or 40 to 60 wt %, or 45 to 55 wt %, based on the total weight of the composition.

In an embodiment, the polycarbonate compositions comprise 60 to 80 wt %, or 65 to 75 wt % of one or more bisphenol A homopolycarbonates, each based on the total weight of the polycarbonate composition, which totals 100 wt %.

The compositions can further comprise a brominated polycarbonate that differs from the polycarbonate. A combination of different brominated polycarbonates can be used. The brominated polycarbonate can be an oligomer or a polymer, and can be derived from an aromatic dihydroxy compound of formula (2) wherein each $R^h$ is bromine and n is 1 to 4; or a bisphenol of formula (3), wherein $X^a$ is as defined for formula (3), p and q are each independently 0 to 4, provided that the sum of p and q is at least 1, and $R^a$ is independently at each occurrence $C_{1-3}$ methyl, $C_{1-3}$ alkoxy, or bromine, provided that at least one $R^a$ is bromine. In an embodiment, a combination of two or more different brominated aromatic dihydroxy compounds can be used. Alternatively, the brominated polycarbonate can be derived from a combination of brominated and non-brominated aromatic dihydroxy compounds. If a non-brominated aromatic dihydroxy compound is used, any of the above-described bisphenols (3) can be used. In an embodiment, when a non-brominated aromatic dihydroxy compound is used, the non-brominated aromatic dihydroxy compound can be bisphenol A. If a combination of brominated and non-brominated aromatic dihydroxy compounds is used, then preferably the combination includes at least 25 mole percent (mol %) of the brominated dihydroxy aromatic compound, more preferably at least 25 to 55 mol % of the brominated dihydric phenol, so as to yield a flame retardant brominated polycarbonate. Branched brominated polycarbonate oligomers can also be used, as can compositions of a linear brominated polycarbonate oligomer and a branched brominated polycarbonate oligomer. Combinations of different brominated copolycarbonate oligomers can be used. Suitable brominated polycarbonates are disclosed in U.S. Pat. No. 4,923,933 to Curry, U.S. Pat. No. 4,170,700 to Orlando et al., and U.S. Pat. No. 3,929,908 to Orlando et al.

The brominated polycarbonate can have a bromine content of 10 to 50 wt %, preferably 15 to 40 wt %, or 20 to 30 wt %, 24 to 27.5 wt % each based on the weight of the brominated polycarbonate. Optionally the brominated polycarbonate can have phenol or 2,4,6-tribromophenol endcaps. The brominated polycarbonate can have an intrinsic viscosity of 0.2 to 1.5 deciliter per gram, measured in methylene chloride at 25° C. Within this range, the intrinsic viscosity can be 0.4 to 1 deciliter per gram. The brominated polycarbonate can have an Mw of 1,000 to 30,000 Da, for example 1,000 to 18,000 Da, or 2,000 to 15,000 Da, or 3,000 to 12,000 Da; or, alternatively 15,000 to 25,000 Da, or 20,000 to 25,000 Da. The brominated polycarbonates can branched or linear, or a combination of branched and linear brominated polycarbonates can be used.

In a preferred embodiment, the brominated aromatic dihydroxy compound can be 2,2-bis(3,5-dibromo-4-hydroxyphenyl)propane (2',6,6'-tetrabromo-4,4'-isopropylidenediphenol (TBBPA)), bis(3,5-dibromo-4-hydroxyphenyl)menthanone, or 2,2',6,6'-tetramethyl-3,3',5,5'-tetrabromo-4,4'-biphenol; and the non-brominated aromatic dihydroxy compounds for copolymerization with the brominated aromatic dihydroxy compounds include bisphenol A, bis(4-hydroxyphenyl) methane, 2,2-bis(4-hydroxy-3-methylphenyl)propane, 4,4-bis(4-hydroxyphenyl)heptane, and (3,3'-dichloro-4,4'-dihydroxydiphenyl)methane. In another preferred embodiment, the brominated polycarbonate includes brominated carbonate units derived from TBBPA and carbonate units derived from bisphenol A, and more preferably comprises 30 to 70 wt % of TBBPA and 30 to 70 wt % of bisphenol A, or 45 to 55 wt % of TBBPA and 45 to 55 wt % of bisphenol A.

The polycarbonate compositions can comprise 10 to 30 wt %, or 15 to 25 wt % of the brominated polycarbonate, wherein the wt % is based on the total weight of the composition, which totals 100 wt %. The brominated polycarbonate can be used in an amount that contributes 2 to 20 wt % of bromine to the composition, based on the total weight of the composition.

The polycarbonate compositions can further comprise a poly(carbonate-siloxane) copolymer comprising carbonate units and siloxane units. The carbonate units are as described above in formulas (1) and (1a), derived from aromatic dihydroxy compounds (2), and (3). In a specific embodiment, the carbonate units are of formula (1a). The composition further comprises a poly(carbonate-siloxane), also referred to in the art as a polycarbonate-polysiloxane copolymer or a poly(carbonate-siloxane) elastomer.

The siloxane units (also referred to as polysiloxane blocks) are optionally of formula (5)

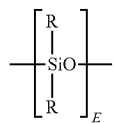

(5)

wherein each R is independently a $C_{1-13}$ monovalent organic group. For example, R can be a $C_{1-13}$ alkyl, C-$C_{13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with one or more of fluorine, chlorine, bromine, or iodine. In an embodiment, where a transparent poly(carbonate-siloxane) is desired, R is unsubstituted by halogen. A combination of the foregoing R groups can be used in the same poly(carbonate-siloxane).

In an embodiment, each R is independently a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In still another embodiment, each R is independently methyl, trifluoromethyl, or phenyl.

The value of E in formula (10) can vary widely depending on the type and relative amount of each component in the thermoplastic composition, the desired properties of the composition, and like considerations. Generally, E has an average value of 2 to 1,000, or 2 to 500, 2 to 200, or 2 to 125, 5 to 80, or 10 to 70. In an embodiment, E has an average value of 10 to 80 or 10 to 40, and in still another embodiment, E has an average value of 40 to 80, or 40 to 70. Where E is of a lower value, e.g., less than 40, it can be desirable to use a relatively larger amount of the poly(carbonate-siloxane) copolymer. Conversely, where E is of a higher value, e.g., greater than 40, a relatively lower amount of the poly(carbonate-siloxane) copolymer can be used. A combination of a first and a second (or more) poly(carbonate-siloxane)s can be used, wherein the average value of E of the first copolymer is less than the average value of E of the second copolymer.

Suitable siloxane units have been described, for example, in WO 2008/042500 A1, WO 2010/076680 A1, and WO 2016/174592 A1. In an embodiment, the siloxane units are of formula (6)

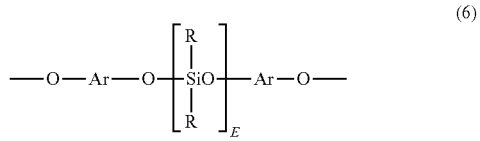

(6)

wherein E is as defined for formula (5); each R can be the same or different, and is as defined for formula (5); and Ar can be the same or different, and is a substituted or unsubstituted $C_6$-$C_{30}$ arylene, wherein the bonds are directly connected to an aromatic moiety. Ar groups in formula (6) can be derived from a $C_6$-$C_{30}$ dihydroxyarylene compound, for example a dihydroxy compound of formula (2) or formula (3). Exemplary dihydroxy compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane, or a combination thereof.

Specific examples of siloxane units of formula (6) include those of the formulas (6a) and (6b)

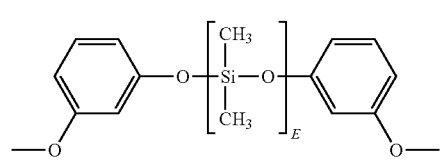

(6a)

-continued

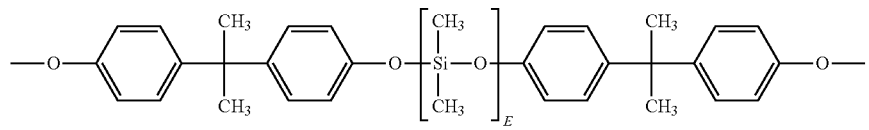
(6b)

wherein E is as described in Formula (5). In an embodiment, E has an average value of 10 to 80 or 10 to 40, and in still another embodiment, E has an average value of 40 to 80, or 40 to 70.

In another embodiment, the siloxane units are of formula (7)

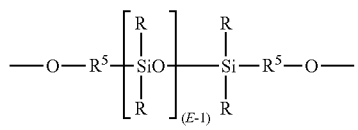
(7)

wherein R and E are as described for formula (5), and each $R^5$ is independently a divalent $C_{1-30}$ hydrocarbylene group, and wherein the polymerized polysiloxane unit is the reaction residue of its corresponding dihydroxy compound. In a specific embodiment, the polydiorganosiloxane blocks are of formula (8):

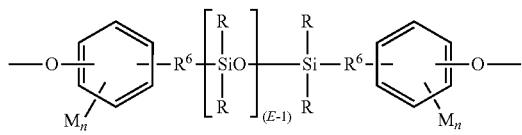
(8)

wherein R and E are as defined for formula (5). $R^6$ in formula (8) is a divalent $C_{2-8}$ aliphatic group. Each M in formula (7) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ arylalkylene, $C_{7-12}$ arylalkylenoxy, $C_{7-12}$ alkylarylene, or $C_{7-12}$ alkylarylenoxy, wherein each n is independently 0, 1, 2, 3, or 4.

In an embodiment in formula (8), M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl.

In another embodiment in formula (8), R is methyl, or a combination of methyl and trifluoropropyl, or a combination of methyl and phenyl. In still another embodiment in formula (8), R is methyl, M is methoxy, n is one, and $R^6$ is a divalent $C_{1-3}$ aliphatic group. preferred polydiorganosiloxane blocks are of the formulas

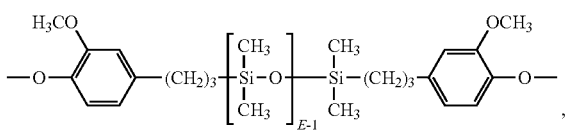
(8a)

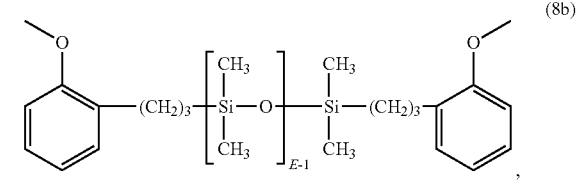
(8b)

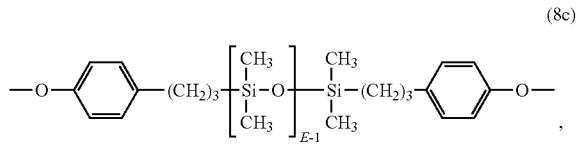
(8c)

or a combination thereof, wherein E has an average value of 10 to 100, preferably 20 to 60, more preferably 30 to 50, or 40 to 50.

In an embodiment, the poly(carbonate-siloxane) comprises carbonate units derived from bisphenol A, and repeating siloxane units (8a), (8b), (8c), or a combination thereof (preferably of formula 7a), wherein E has an average value of E has an average value of 10 to 100, or 20 to 60, or 30 to 60, or 40 to 60. In an embodiment, the poly(carbonate-siloxane)s comprise carbonate units derived from bisphenol A and repeating siloxane units of formula (8a) (8b), or (8c), wherein E has an average value of 10 to 100, or 20 to 60, or 30 to 50, or 40 to 50.

The poly(carbonate-siloxane) can have a siloxane content of 30 to 80 wt %, or 30 to 70 wt %, or 35 to 70 wt %, or 35 to 65 wt %, or 35 to 62 wt %, each based on the total weight of the poly(carbonate-siloxane). As used herein, "siloxane content" of the poly(carbonate-siloxane) means the content of siloxane units based on the total weight of the poly (siloxane-carbonate). The poly(carbonate-siloxane) can have a weight average molecular weight of 26,000 to 45,000 Da, or 30,000 to 43,000 Da, or 35,000 to 40,000 Da as measured by gel permeation chromatography using a cross-linked styrene-divinyl benzene column, at a sample concentration of 1 milligram per milliliter, and as calibrated with bisphenol A polycarbonate standards. In other embodiments, the poly(carbonate-siloxane) can have a weight average molecular weight of 10,000 to 100,000 Da, or 50,000 to 100,000 Da. In some embodiments, good electrical tracking resistance (e.g., wherein a molded sample of the composition does not show tracking after at least 50 drops of an aqueous 0.1% ammonium chloride solution measured at 600 V determined according to ASTM D-3638) is obtained in compositions where the poly(carbonate-siloxane) has less than 60 wt % of siloxane blocks, e.g., 30 to 50 wt %, or 35 to 45 wt %, each based on the total weight of the poly (carbonate-siloxane).

In an embodiment the poly(carbonate-siloxane) can have carbonate blocks having a glass transition temperature greater than 70° C., greater than 75° C., or greater than 80° C., and siloxane blocks having a glass transition temperature of minus 130 to minus 50° C. or minus 130 to minus 100° C. In these embodiments, the poly(carbonate-siloxane) copolymers are elastomers, which are known, and described for example in U.S. Pat. No. 84,666,249 to Gallucci et al. In a preferred embodiment, the poly(carbonate-siloxane) elastomer can have at least 30% elongation before yield as measured by ASTM D638. In an embodiment the poly (carbonate-siloxane)s can have one or more of a percent transmission (% T) of 70% or greater, and a haze level of 10% or less, when measured at 1.0 mm thickness according to ASTM D1003; a yellowness index of 10 or less, when measured according to ASTM D629; or a Shore D hardness of from 5 to 20 as measured by ASTM D2240. A preferred poly(carbonate-siloxane) elastomer comprises bisphenol A carbonate units and dimethylsiloxane units.

The polycarbonate compositions can include 2 to 10 wt %, or 3 to 10 wt %, or 3 to 5 wt %, or 4 to 5 wt % of the poly(carbonate-siloxane) elastomer, based on the total weight of the composition, which totals 100 wt %.

The polycarbonate composition can further include at least two different impact modifiers, a core-shell silicone-(meth)acrylate impact modifier, and an alkenyl aromatic-olefin block copolymer impact modifier. The impact modifiers can generally have an elastomeric (i.e., rubbery) polymer core or substrate having a Tg less than 10° C., or less than −10° C., or −40° to −80° C., and a rigid polymeric superstrate grafted to the elastomeric polymer substrate.

The core-shell silicone-(meth)acrylate impact modifier can include a rubbery silicone core and a grafted rigid (meth)acrylate shell rigid shell. The silicone core can comprise dimethyl siloxane units. The (meth)acrylate monomers used to form the shell are generally a combination of a monofunctional and a copolymerizable polyfunctional (meth)acrylate monomer. Examples of monofunctional (meth)acrylate monomers include branched or straight chain ($C_{1-8}$ alkyl) (meth)acrylates and glycidyl (meth)acrylate, and examples of copolymerizable polyfunctional monomers include allyl (meth)acrylate, ethylene glycol dimethacrylate, and 1,3-butylene glycol dimethacrylate. Preferred monomers are the $C_{1-6}$ alkyl methacrylates such as methyl methacrylate. Other monomers can optionally be present in the silicone core or the rigid shell, for example, styrene, α-methylstyrene, halogen or $C_{1-3}$ alkyl substituted styrene, acrylonitrile, methacrylonitrile, maleic acid, maleic anhydride, $C_{1-4}$ alkyl and phenyl N-substituted maleimide, divinyl benzene, triallyl cyanurate, triallyl isocyanurate, diallyl phthalate, and the like.

Methods for preparing the core-shell silicone-(meth)acrylate impact modifier are known in the art, as described for example in U.S. Pat. Nos. 7,615,594, 4,888,388, and 4,963,619. The silicone (meth)acrylate impact modifiers can be prepared by emulsion polymerization, wherein, for example a silicone rubber monomer is reacted with a first graft link monomer to form a silicone rubber latex, in the presence of a surfactant such as dodecylbenzenesulfonic acid. Alternatively, a cyclic siloxane such as cyclooctamethyltetrasiloxane and a tetraethoxyorthosilicate can be reacted with a first graft link monomer such as (gamma-methacryloxypropyl)methyl dimethoxysilane. The monofunctional (meth)acrylate monomer is then polymerized with the silicone rubber particles, optionally in presence of a cross linking monomer, such as allyl methacrylate, in the presence of a free radical generating polymerization catalyst such as benzoyl peroxide. In an embodiment the impact modifier is prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and can catalyze transesterification or degradation of polycarbonates. Instead, ionic sulfate, sulfonate, or phosphate surfactants can be used in preparing the impact modifiers, particularly the elastomeric substrate portion of the impact modifiers. Useful surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, or a combination thereof. A specific surfactant is a $C_{6-16}$, preferably a $C_{8-12}$ alkyl sulfonate. This emulsion polymerization process is described and disclosed in various patents and literature of such companies as Dow and General Electric Company.

The core-shell silicone-(meth)acrylate impact modifier can have a rubber content of 30 to 90 wt %; and a silicon core content of 50 to 80 wt %, or 60 to 70 wt %, or 65 to 75 wt %. This silicone (meth)acrylate impact modifier can have an average particle size of 100 nanometers to 2 micrometers. In an embodiment, the particle size is of 200 to 400 nm, or greater than 400 nm, or greater than 500 nm.

Specific core-shell silicone-(meth)acrylate impact modifiers that can be used include those available commercially, e.g., from Mitsubishi Rayon Co. Ltd., under the trade names METABLEN S-2001, METABLEN S-2100, METABLEN S-2200, and METABLEN S-2501.

The polycarbonate composition can comprise 1 to 10 wt % of the core-shell silicone-(meth)acrylate impact modifier, such as 1 to 5 wt %, or 3 to 5 wt %. In an embodiment, the polycarbonate composition comprises 4 to 10 wt % of a core-shell silicone-(meth)acrylate impact modifier, or 5 to 10 wt %, such as 5 to 6 wt %, wherein the wt % is based on the total weight of the composition, which totals 100 wt %.

The second impact modifier is an alkenyl aromatic-olefin block copolymer impact modifier. The elastomeric phase can be a high molecular weight elastomeric material derived from an olefin or a conjugated diene. The polymers formed from conjugated dienes can be fully or partially hydrogenated. Optionally other copolymerizable monomers can be present, such as (meth)acrylic acids or their $C_{1-8}$ alkyl ester derivatives. For example, the elastomeric phase can include conjugated diene rubbers, for example polybutadiene and polyisoprene; copolymers of a conjugated diene with less than 50 wt. % of a copolymerizable monomer, for example a monovinylic compound such as styrene, acrylonitrile, n-butyl acrylate, or ethyl acrylate; or olefin rubbers such as ethylene propylene copolymers (EPR) or ethylene-propylene-diene monomer rubbers (EPDM). The rigid phase can be formed from alkenyl aromatic aromatic monomers such as styrene and alpha-methyl styrene. Optionally, other monovinylic monomers such as acrylonitrile or (meth)acrylic acids or their $C_{1-8}$ alkyl ester derivatives can be present, such as methyl methacrylate.

Specific alkenyl aromatic-olefin block copolymer impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Such impact modifiers include those available commercially, e.g., from Kraton Polymers under the trade names KRATON G and KRATON F series.

The polycarbonate composition can comprise 0.5 to 5 wt % of the alkenyl aromatic-olefin block copolymer impact modifier, preferably 1.5 to 5 wt % or 2 to 5 wt %, or 2 to 3 wt %, wherein the wt % is based on the total weight of the composition, which totals 100 wt %.

The polycarbonate composition can optionally further comprise an epoxy hydrostabilizer. The epoxy hydrostabilizer can have a molecular weight of 2,500 to 8,500 Da, or 3,000 to 6,000 Da. The epoxy hydrostabilizer can have an epoxy equivalent weight (EEW) of 180 to 2800 g/mol, or 190 to 1400 g/mol, or 200 to 700 g/mol. In an embodiment the epoxy hydrostabilizer can comprise styrenic and acrylic groups, for example the epoxy hydrostabilizers described in US 2013/0131255 and U.S. Pat. No. 6,984,694, or available under the trade names JONCRYL (e.g., JONCRYL ADR 4368 (a styrene-acrylate copolymer with epoxy functionality). Other epoxy hydrostabilizers include Joncryl ADR 4300 (epoxidized soybean oil). The polycarbonate composition can comprise 0.5 to 5 wt % of the alkenyl aromatic-olefin block copolymer impact modifier, preferably 1.5 to 5 wt % or 2 to 5 wt %, or 2 to 3 wt %, wherein the wt % is based on the total weight of the composition, which totals 100 wt %.

In addition to the polycarbonate, brominated polycarbonate, poly(carbonate-siloxane elastomer, and impact modifiers, the polycarbonate composition can include various additives ordinarily incorporated into polymer compositions of this type, with the proviso that the additive(s) are selected so as to not significantly adversely affect the desired properties of a thermoplastic composition, in particular electrical tracking resistance, flame retardant performance, and/or low-temperature impact properties. Such additives can be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of an anti-drip agent, a UV stabilizer, and a colorant. In general, the additives are used in the amounts generally known to be effective. For example, the total amount of the additives (other than any impact modifier, filler, or reinforcing agents) can be 0.01 to 5 wt %, based on the total weight of the polycarbonate composition. For example, the total amount of the additives (other than any impact modifier) can be 0.01 to 5 wt % based on the total weight of the polycarbonate composition.

The polycarbonate compositions can optionally include a colorant composition containing pigment or dye additives. Useful pigments can include, for example, inorganic pigments such as metal oxides and mixed metal oxides such as zinc oxide, titanium dioxides, or iron oxides; sulfides such as zinc sulfides; aluminates; sodium sulfo-silicates sulfates, chromates; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combination thereof.

The compositions can have any suitable color including white, gray, light gray, black, and the like. The gray or black color can exhibit an L* value of below 80. A composition having a gray or black color can comprise an amount of carbon black of greater than zero and less 3.0 wt %, or less than 1.5 wt %, each based on the total weight of the colorant composition. In an embodiment, a molded sample having a thickness of 1 mm formed from the composition has an average L* value of 29 or less as measure by the CIE Lab method, 10 degree observer, D65 illuminant, specular component included, measured in reflectance mode.

In an embodiment, the polycarbonate compositions comprise up to 10 wt % of titanium dioxide, carbon black, an inorganic pigment, an organic pigment, a dye, or a combination thereof, based on the total weight of the compositions. Alternatively, the polycarbonate composition comprises a colorant, such as a black colorant, preferably comprising 0.1 to 0.5 wt % of carbon black, or 0.2 to 0.5 wt % carbon black, based on the total weight of the composition. The polycarbonate composition can comprise 0.1 to 0.5 wt % of an organic dyes, such as 0.2 to 0.5 wt %, based on the total weight of the polycarbonate composition.

A combination of other additives can be used, for example a combination of a mold release agent, a heat stabilizer, and a light stabilizer. In general, the additives are used in the amounts generally known to be effective. In an embodiment, the composition comprises 0.01 to 0.5 wt % of a mold release agent, such as 0.01 to 0.2 wt %, or 0.01 to 0.1 wt % of a mold release agent, based on the total weight of the polycarbonate composition; 0.01 to 0.5 wt % of a heat stabilizer, such as 0.01 to 0.2 wt %, or 0.01 to 0.1 wt % of the heat stabilizer, based on the total weight of the polycarbonate composition; and 0.01 to 0.5 wt % of a light stabilizer, such as 0.01 to 0.2 wt %, or 0.01 to 0.1 wt % of the light stabilizer, based on the total weight of the polycarbonate composition.

The polycarbonate compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

As discussed above, the polycarbonate compositions are formulated to have excellent physical properties, including excellent hydrolytic stability. Hydrolytic stability concerns the ability of a product to withstand chemical decomposition through hydrolysis, for instance by maintaining molecular weight or strength after prolonged exposure to water. For high-end applications, such as at voltages of 1500, good hydrolytic stability and electrical tracking performance that does not compromise impact and flame retardant performance is desirable. In an embodiment, the hydrolytic stability is comparable or superior to the hydrolytic stability of EXL9330P, available from SABIC.

A molded sample of the polycarbonate composition retains at least 80 percent, preferably at least 85 percent, 90 percent, 95 percent, 97 percent, or 98 percent Mw after 336 hours in a hydrolytic chamber at 85° C. and 85 percent relative humidity. A molded sample of the polycarbonate composition retains at least 60 percent, preferably at least 65 percent, 70 percent, 80 percent, or 85 percent Mw after 692 hours in a hydrolytic chamber at 85° C. and 85 percent relative humidity. A molded sample of the polycarbonate composition retains at least 50 percent, preferably at least 55 percent, 60 percent, 65 percent, 70 percent, 75 percent, or 80 percent Mw after 1000 hours in a hydrolytic chamber at 85° C. and 85 percent relative humidity.

A molded sample of the polycarbonate composition retains at least 80 percent, preferably at least 85 percent, 90 percent, 95 percent, 97 percent, or 98 percent notched Izod impact strength as measured at 23° C. according to ASTM D256 after 336 hours in a hydrolytic chamber at 85° C. and 85 percent relative humidity. A molded sample of the polycarbonate composition retains at least 60 percent, preferably at least 70 percent, 80 percent, 90 percent, or 95 percent notched Izod impact strength as measured at 23° C. according to ASTM D256 after 692 hours in a hydrolytic chamber at 85° C. and 85 percent relative humidity. A molded sample of the polycarbonate composition retains at least 55 percent, preferably at least 60 percent, 65 percent, 70 percent, 75 percent, 80 percent, or 85 percent notched Izod impact strength as measured at 23° C. according to ASTM D256 after 1000 hours in a hydrolytic chamber at 85° C. and 85 percent relative humidity.

The polycarbonate compositions have excellent physical properties, including excellent electrical tracking performance. In an embodiment, the compositions have number of drops to tracking at 600 volts greater than or equal to 50 drops, greater than or equal to 60 drops, greater than or equal to 70 drops, greater than or equal to 75 drops, or greater than or equal to 80 drops, determined according to ASTM D-3638-85.

A molded sample of the polycarbonate composition can have good low-temperature impact properties. A molded sample of the polycarbonate composition having a thickness of 3.2 millimeters can have a Notched Izod Impact (NII) strength of greater than 500 Joules/meter, greater than 600 Joules/meter, greater than 700 Joules/meter, or greater than 800 Joules/meter measured at −30° C. in accordance with ASTM D256. The molded sample of a polycarbonate composition can further have a ductility measured at −30° C. of 90 to 100%, or 90 to 100%, or 100%, each as measured in accordance with ASTM 256.

A molded sample of the polycarbonate composition having a thickness of 3.2 millimeters can have an NII strength of greater than 300 Joules/meter, greater than 400 Joules/meter, or greater than 500 Joules/meter, measured at −40° C. in accordance with ASTM D256. The molded sample of a polycarbonate composition can further have a ductility measured at −40° C. of 20 to 100%, or 50 to 100%, or 80 to 100%, each as measured in accordance with ASTM 256.

Without being bound by theory, it is believed that the surprising combination of good electrical tracking performance and good low temperature impact properties are due to the compatibility of the compositions, as shown in their microstructure. As described in the Examples, molded plaques having the above CTI and low temperature impact properties can a continuous phase comprising a polycarbonate component. Disposed in the polycarbonate phase are first and second domains including two different impact modifiers. The two impact modifiers have in strong interfacial interaction or association. Molded plaques of the samples that fail CTI show evidence of agglomeration of the two domains. Accordingly, in an embodiment molded plaques comprising the compositions can have first domains comprising the core-shell silicone-(meth)acrylate impact modifier, wherein the first domains have an aspect ratio of at least 1.7, preferably at least 1.8, each as determined by scanning transmission electron microscopy. Further, a molded plaque comprising the compositions can have second domains comprising the alkenyl aromatic-olefin block copolymer impact modifier, wherein the second domains have an aspect ratio of at least 3, preferably at least 4, each as determined by scanning transmission electron microscopy. The second domains can further have a domain size of 6400 square nanometers or less, more preferably 5700 square nanometers or less, each as determined by scanning transmission electron microscopy (STEM). The measurements are made of the outer surface of a molded sample comprising the composition, specifically of the top 10 micrometers of the sample. In some embodiments, a molded sample of the composition with the indicated domain sizes does not show tracking after at least 50 drops of an aqueous 0.1% ammonium chloride solution measured at 600 V as determined by ASTM D-3638-85; and a molded sample of the composition having a thickness of 3.2 millimeters has at least one of the following properties: a notched Izod impact strength of greater than 500 Joules/meter and a ductility of 100% measured according to ASTM D256 at a temperature of −30° C.; a notched Izod impact strength of greater than 600 Joules/meter and a ductility of 100% measured according to ASTM D256 at a temperature of −30° C.; or a notched Izod impact strength of greater than 500 Joules/meter and a ductility of 100% measured according to ASTM D256 at a temperature of −40° C.

A molded sample of the polycarbonate composition having a thickness of 0.8 millimeters can have a UL94 flame retardance rating of V0.

In an embodiment, the thermoplastic composition comprises 60 to 80 wt % of the polycarbonate; 10 to 30 wt % of a brominated polycarbonate; 0.1 to 5 wt %, or 2 to 5 wt % of a poly(carbonate-siloxane) comprising 30 to 70 wt % siloxane blocks, wherein the siloxane blocks comprise an average of 40 to 60 mol % siloxane units; 1 to 10 wt % of a core-shell silicone-(meth)acrylate impact modifier comprising a silicone elastomer core and an MMA copolymer shell; and 2 to 3 wt % of an alkenyl aromatic-olefin block copolymer impact modifier; wherein the wt % of each component is based on the total weight of the composition, which totals 100 wt %. In this embodiment, the composition can have enhanced hydrolytic stability and one or more of good low-temperature impact performance, good electrical tracking performance, and/or flame retardance.

In another embodiment, the thermoplastic composition comprises 65 to 75 wt % of the polycarbonate, wherein the polycarbonate comprises a first bisphenol A homopolycarbonate having a weight average molecular weight of 21,000 to 23,000 Da in an amount of 15 to 30 wt %, and a second bisphenol A homopolycarbonate having a weight average molecular weight of 29,900 to 31,000 Da in an amount of 40 to 60 wt %; 15 to 25 wt % of a brominated bisphenol A polycarbonate; 0.1 to 5 wt %, or 2 to 5 wt % of a poly(bisphenol A carbonate-dimethyl siloxane) elastomer comprising 60 to 80 wt % of dimethylsiloxane blocks; 3 to 5 wt % of a core-shell dimethylsiloxane-methyl methacrylate copolymer impact modifier; 3 to 5 wt % of a styrene-ethylene/butylene-styrene block copolymer; 0.1 to 0.5 wt % of a poly(tetrafluoroethylene)-encapsulated styrene-acrylonitrile; and 0.1 to 3 wt % of a colorant, 0.1 to 1 wt % of an ultraviolet light stabilizer; 0.01 to 1 wt % of a poly (tetrafluoroethylene)-encapsulated styrene acrylonitrile, and 0.01 to 3 wt % of a phosphite stabilizer. In this embodiment, the composition can have good hydrolytic performance, electrical tracking performance, low temperature impact resistance, and/or flame retardance.

In a further embodiment, a molded sample of the composition can retain at least 90 percent Mw after 336 hours in a hydrolytic chamber at 85° C. and 85 percent relative humidity; can retain greater than 85 percent Mw after 692 hours in a hydrolytic chamber at 85° C. and 85 percent relative humidity; can retain greater than 75% Mw after 1000 hours in a hydrolytic chamber at 85° C. and 85% relative humidity; can retain at least 80 percent notched Izod impact strength measured at 23° C. according to ASTM D256 after 336 hours in a hydrolytic chamber at 85° C. and 85 percent relative humidity; can retain at least 65 percent notched Izod impact strength measured at 23° C. according to ASTM D256 after 692 hours in a hydrolytic chamber at 85° C. and 85 percent relative humidity; can retain at least 50 percent notched Izod impact strength measured at 23° C. according to ASTM D256 after 1000 hours in a hydrolytic chamber at 85° C. and 85 percent relative humidity; does not show tracking after at least 50 drops of an aqueous 0.1% ammonium chloride solution measured at 600 V determined according to ASTM D-3638; and has a UL94 flame retardance rating of V0.

Shaped, formed, or molded articles comprising the polycarbonate compositions are also provided. In an embodiment, an article comprising the polycarbonate composition is a molded article, a thermoformed article, an extruded film, an extruded sheet, one or more layers of a multi-layer article, a substrate for a coated article, or a substrate for a metallized article. The polycarbonate compositions can be molded into useful shaped articles by a variety of methods, such as injection molding, extrusion, rotational molding, blow molding, and thermoforming. In another embodiment, at least one of the following articles are contained in or are derived from the compositions encompassed by this disclosure: a solar apparatus, an electrical junction box, an electrical connector, an electrical vehicle charger, an outdoor electrical enclosure, a smart meter enclosure, a smart grid power node, PV (photovoltaic) frame, and miniature circuit breaker (MCB) applications.

This disclosure is further illustrated by the following non-limiting examples.

EXAMPLES

Materials used for the following examples are summarized in Table 1.

TABLE 1

| Component | Description | SOURCE |
|---|---|---|
| PC-1 | Bisphenol A polycarbonate with PCP endcaps, Mw = 29,900 to 31,000, CAS Reg. No. 111211-39-3 | SABIC |
| PC-2 | Bisphenol A polycarbonate with PCP endcaps, Mw = 21,000 to 23,000 Da, CAS Reg. No. 111211-39-3 | SABIC |
| PC-Br | Brominated polycarbonate with PCP endcaps, CAS Reg. No. 156042-31-8 (available as PC 105B) | SABIC |
| PC-Si-20 | Poly(bisphenol A carbonate-dimethylsiloxane) with 20 wt % dimethyl siloxane blocks, PCP endcaps, CAS Reg. No. 202483-49-6 | SABIC |
| PC-Si-40 | Poly(Bisphenol A carbonate-dimethyl siloxane) copolymer with 40 wt % dimethylsiloxane units, PCP endcaps, CAS Reg. No. 202483-49-6 | SABIC |
| PC-Si-60 | Poly(bisphenol A carbonate-dimethylsiloxane) with 60 wt % dimethylsiloxane blocks, PCP endcaps, CAS Reg. No. 202483-49-6 | SABIC |
| PETS | Pentaerythritol tetrastearate, CAS Reg. No. 115-83-3 | FACI |
| IM-Si-1 | Core-shell impact modifier having a silicone/butyl acrylate elastomer core and a methyl acrylate/methyl methacrylate copolymer shell, wherein the core comprises 3.4 percent by weight silicon and has a Tg of −46° C., and having a particle size of 200 to 800 nm (available as METABLEN S-2001) (CAS Reg. No. 143106-82-5) | MITSUBISHI RAYON CO. |
| IM-Si-2 | Core-shell impact modifier having a silicone elastomer core and an MMA copolymer shell, CAS Reg. No. 143106-82-5, having a particle size of greater than 400 nm (available as METABLEN S-2100) | MITSUBISHI RAYON CO. |
| IM-Si-3 | Core-shell impact modifier having a silicone elastomer core and an MMA copolymer shell, CAS Reg. No. 143106-82-5, having a particle size of 200 to 400 nm, available as METABLEN S-2501 | MITSUBISHI RAYON CO. |
| CESA | Epoxy hydrostabilizer, CAS No. 106-91-2 (Joncryl ADR 4468) | BASF |
| IM-Block | Styrene-ethylene/butylene-styrene block copolymer, CAS Reg. No. 124578-11-6 (available as KRATON FG-1901) | KRATON POLYMERS |
| UVA | 2-(2-hydroxy-3,5-di-cumyl)benzotriazole, CAS Reg. No. 70321-86-7 | CIBA |
| TSAN | Poly(tetrafluoroethylene):styrene-acrylonitrile 50:50, CAS Reg. No. 9002-84-0 | SABIC |

The amounts of each component in the compositions of the following examples are reported as percent by weight relative to the total weight of the composition. In addition to the listed components, each of the compositions further contained 20 wt % of PC—Br, 0.3 wt % each of PETS, TSAN, and UVA, 0.06 wt % of a phosphite stabilizer, and 0.5 wt % of carbon black.

The compositions were prepared by pre-blending raw materials and extruding on a 37 mm Toshiba TEM-37BS twin screw. The compositions were melt-kneaded, extruded using the conditions shown in Table 2, cooled through a water batch, and pelletized.

TABLE 2

| Extrusion | Unit | Set Values |
|---|---|---|
| Die | mm | 3 |
| Zone 1 Temp | ° C. | 50 |
| Zone 2 Temp | ° C. | 100 |
| Zone 3-11 Temp | ° C. | 270 |
| Die Temp | ° C. | 270 |
| Screw speed | rpm | 400 |

TABLE 2-continued

| Extrusion | Unit | Set Values |
|---|---|---|
| Throughput | kg/hr | 40 |
| Side feeder speed | rpm | 250 |

Extruded pellets were molded before testing for electrical tracking and impact performance, hydrolytic stability, and FR characteristics. Extruded pellets were dried at 120° C. for three hours. Samples were molded from the pellets in a FANUC or Netstal molding machine. Molding conditions used in the injection molding machines are summarized in Table 4.

TABLE 3

| Parameters | Unit | PTI test chip | Izod bar | Flame bar |
|---|---|---|---|---|
| Cnd: Pre-drying time | Hour | 3 | 3 | 3 |
| Cnd: Pre-drying temp | ° C. | 120 | 120 | 120 |
| Hopper temp | ° C. | 50 | 50 | 50 |
| Zone 1 temp | ° C. | 300 | 275 | 275 |
| Zone 2 temp | ° C. | 300 | 280 | 315 |
| Zone 3 temp | ° C. | 300 | 285 | 320 |
| Nozzle temp | ° C. | 300 | 280 | 325 |
| Mold temp | ° C. | 100 | 75 | 50 |
| Screw speed | rpm | 100 | 100 | 80 |
| Back pressure | kgf/cm$^2$ | 68 | 68 | 70 |
| Injection speed | mm/s | 30 | 30 | 90 |
| Max. injection pressure | kgf/cm$^2$ | 1200 | 1200 | 2400 |
| Molding Machine | NONE | FANUC | FANUC | Netstal |
| Mold Type | NONE | Color chip step 1/2 | Axxicon Izod | ULA-0.8 mm |

Electrical tracking performance was assessed by measuring proof tracking index (PTI) according to ASTM D3638 (600 V, using a 90 mm×1 mm or 2 mm color chip), in which a 0.1% ammonium chloride solution was added dropwise to a sample surface at a rate of one drop per 30 seconds. A passing result is achieved when the number of drops is 50 or higher.

For hydrolytic stability assessments, Izod bars were placed into hydrolytic chamber at 85° C. and 85% relative humidity (RH) for pre-determined time intervals. The samples were then removed from the ovens for characterization of Mw and impact properties. Hydrolytic stability was assessed by comparison of the weight average molecular weight of polycarbonate before and after hydrolytic stress as described above. The data were converted to percent retention of the initial Mw and the data are shown in the following tables indicated as "Dual 85, Mw retention." Mw was determined by gel permeation chromatography (GPC). Hydrolytic stability was also assessed by comparison of Notched Izod impact strength (NII) at 23° C. of a formulation before and after hydrolytic stress. The data were converted to percent retention of the initial NII and the data are shown in the following tables indicated as "Dual 85, NII (2° C.) retention."

Impact properties were evaluated by Notched Izod impact testing (NII) at temperatures of 23° C., −30° C., or −40° C. according to ASTM D256 using bars (63.5 mm×12.7 mm×3.2 mm).

Flame retardance (FR) testing was performed following the procedure of Underwriter's Laboratory Bulletin 94 entitled "Tests for Flammability of Plastic Materials, UL94." Several ratings can be applied based on the rate of burning, time to extinguish, ability to resist dripping, and whether or not drips are burning. Bars (127 mm×12.7 mm×3 mm or 1 mm) were tested for vertical burn.

Molecular weight was determined by GPC using a cross-linked styrene-divinylbenzene column and calibrated to bisphenol A homopolycarbonate references. GPC samples are prepared at a concentration of 5 mg per ml, and are eluted at a flow rate of 1 ml per minute.

Scanning transmission electron microscopy (STEM) was performed to study the morphology of molded plaques. Samples were cryo-microtomed using a Leica EM UC7/FC7 from a near surface edge and towards the core as bulk morphology. These were vapor stained using $OsO_4$ for 15 minutes and $RuO_4$ for 4 minutes and imaged in STEM mode using Carl Zeiss Supra 40 VP. Images were analyzed for domain size, which is expressed as equivalent circular diameter, and shape, which is expressed as aspect ratio distribution of the SEBS and acrylic domains using Clemex Vision PE version 8.0.56. Statistical comparison was performed using JMP® to test median and variance analysis.

Examples E1 to E3 and CE4 to CE5

Examples E1 to E3 and CE4 to CE5 and were prepared according to Table 4, and were characterized according to methods described above. Results are shown in Table 4.

TABLE 4

| | Unit | E1 | E2 | E3 | CE4 | CE5 |
|---|---|---|---|---|---|---|
| Components | | | | | | |
| PC-2 | % | 32 | 32 | 32 | 32 | 32 |
| PC-1 | % | 38.04 | 37.89 | 36.89 | 35.89 | 25.04 |
| PC-Si-20 | % | | | | 3 | 22 |
| PC-Si-60 | % | 1 | 1 | 2 | | |
| CESA | % | | 0.15 | 0.15 | 0.15 | |
| IM-Si-1 | % | 5 | 5 | 5 | 5 | |
| IM-Block | % | 3 | 3 | 3 | 3 | |
| Low-temperature impact property | | | | | | |
| NII, −30° C. | J/m | 639 | 338 | 413 | 407 | |
| Ductility, −30° C. | % | 100 | 0 | 20 | 0 | |
| NII, −40° C. | J/m | 413 | 238 | 286 | 253 | |
| Ductility, −40° C. | % | 20 | 0 | 0 | 0 | |
| Dual 85, Mw retention (at indicated aging time) | | | | | | |
| 336 h | % | 81 | 83 | 85 | 81 | 91 |
| 692 h | % | 66 | 70 | 72 | 65 | 86 |
| 1000 h | % | 54 | 60 | 60 | 54 | 78 |
| Dual 85, NII (23° C.) retention (at indicated aging time) | | | | | | |
| 336 h | % | 83 | 85 | 81 | 81 | 79 |
| 692 h | % | 41 | 32 | 66 | 40 | 66 |
| 1000 h | % | 7 | 9 | 19 | 6 | 56 |

Table 4 shows the effect of varying the amounts of PC—Si-20 and PC—Si-60 in the composition. Examples E1 to E3 and CE4 contained IM-1, a core-shell impact modifier having an average particle size of 100 to 44 nm. E1 exhibited 100% ductility and an NII of 639 J/m at −30° C. Addition of an epoxy-type hydro tabilizer in E2 improved Mw retention relative to E1 but negatively impacted low temperature NII. Increasing PC—Si-60 loading from 1 wt % (E1 and E2) to 2 wt % (E3) slightly improved low temperature NII. No significant effect on low temperature NII was observed in CE5, and the example including PC—Si-60 displayed better Mw retention (6% higher at 1000 h).

Examples E1, CE4, E6 to E8, and CE9 to CE14

Examples E6 to E 8 and CE9 to CE14 were prepared according to Table 5 and were characterized according to methods described above. Results for E1 and E6 to E8, and CE4 and CE9 to CE14 are shown in Table 5.

Examples E1, E6, and E15 to E17

Examples E15-E17 were prepared according to Table 6, and were characterized according to methods described above. Results are shown in Table 6 along with examples E1 and E6 described above.

TABLE 6

| | | Example No. | | | | |
|---|---|---|---|---|---|---|
| | Unit | E1 | E6 | E15 | E16 | E17 |
| Component | | | | | | |
| PC-2 | % | 32 | 32 | 32 | 20 | 20 |
| PC-1 | % | 38.04 | 38.04 | 38.04 | 50.54 | 49.04 |
| PC-Si-20 | % | | | | | |
| PC-Si-60 | % | 1 | 1 | 1 | 1.5 | 2 |
| IM-Si-1 | % | 5 | | | | |

TABLE 5

| | | Example No. | | | | | | | | | | |
|---|---|---|---|---|---|---|---|---|---|---|---|---|
| | Unit | E1 | E6 | E7 | E8 | CE4 | CE9 | CE10 | CE11 | CE12 | CE13 | CE14 |
| Component | | | | | | | | | | | | |
| PC-2 | % | 32 | 32 | 32 | 32 | 32 | 32 | 10 | 20 | 20 | 20 | 20 |
| PC-1 | % | 38.04 | 38.04 | 37.04 | 36.89 | 35.89 | 35.89 | 57.89 | 48.04 | 48.04 | 49.04 | 49.04 |
| PC-Si-20 | % | | | | | 3 | 3 | 3 | 3 | 3 | 3 | 2 |
| PC-Si-60 | % | 1 | 1 | 2 | 2 | | | | | | | |
| CESA | % | | | | 0.15 | 0.15 | 0.15 | 0.15 | | | | |
| IM-Si-1 | % | 5 | | | | 5 | | | 5 | | | |
| IM-Si-2 | % | | 5 | 5 | 5 | | 5 | 5 | | 5 | 5 | 5 |
| IM-Block | % | 3 | 3 | 3 | 3 | 3 | 3 | 3 | 3 | 3 | 2 | 3 |
| Low-temperature impact property | | | | | | | | | | | | |
| NII, −30° C. | J/m | 639 | 522 | 661 | 211 | 407 | 279 | 434 | 650 | 628 | 658 | 585 |
| Ductility, −30° C. | % | 100 | 60 | 100 | 0 | 0 | 0 | 20 | 100 | 100 | 100 | 100 |
| NII, −40° C. | J/m | 413 | 424 | 415 | 198 | 253 | 190 | 252 | 487 | 390 | 322 | 362 |
| Ductility, −40° C. | % | 20 | 0 | 0 | 0 | 0 | 0 | 0 | 60 | 0 | 0 | 0 |
| Dual 85, Mw retention (at indicated aging time) | | | | | | | | | | | | |
| 336 h | % | 81 | 94 | 93 | 94 | 81 | 94 | 95 | 82 | 92 | 93 | 93 |
| 692 h | % | 66 | 85 | 84 | 87 | 65 | 87 | 81 | 66 | 82 | 85 | 82 |
| 1000 h | % | 54 | 75 | 75 | 80 | 54 | 79 | 79 | 54 | 72 | 77 | 73 |
| Dual 85, NII (23° C.) retention (at indicated aging time) | | | | | | | | | | | | |
| 336 h | % | 83 | 97 | 92 | 100 | 81 | 97 | 98 | 85 | 94 | 96 | 96 |
| 692 h | % | 41 | 92 | 86 | 100 | 40 | 90 | 101 | 64 | 83 | 88 | 84 |
| 1000 h | % | 7 | 78 | 75 | 92 | 6 | 69 | 85 | 12 | 71 | 78 | 64 |

As is shown in Table 5, Examples E6 to E8, CE9 to CE10, and CE12 to CE14 contained 5 wt % IM-2 and showed significantly better hydrolytic stability relative to E1, CE4, and CE11, which included IM-1. Increasing PC—Si-60 loading from 1 wt % (E6) to 2 wt % (E7) resulted in improvement in low temperature NII. Adding an epoxy-type hydrostabilizer, as can be seen in comparison of E7 and E8, benefitted Mw retention at 1000 h but detrimentally impacted low temperature NII. E6 and CE12, which included IM-2 as impact modifier, demonstrated good low-temperature impact performance and hydrolytic stability. CE11 demonstrated good low-temperature impact performance and marginal molecular weight retention at 1000 hours. No samples exhibited passing electrical tracking PTI at 600V (data not shown in Table 5).

TABLE 6-continued

| | | Example No. | | | | |
|---|---|---|---|---|---|---|
| | Unit | E1 | E6 | E15 | E16 | E17 |
| IM-Si-2 | % | | 5 | | | |
| IM-Si-3 | % | | | 5 | 5 | 5 |
| IM-Block | % | 3 | 3 | 3 | 2 | 3 |
| Low-temp impact property | | | | | | |
| NII, −30° C. | J/m | 639 | 522 | 670 | 660 | 650 |
| Ductility, −30° C. | % | 100 | 60 | 100 | 100 | 100 |
| NII, −40° C. | J/m | 413 | 424 | 490 | 623 | 580 |
| Ductility, −40° C. | % | 20 | 0 | 60 | 100 | 100 |

TABLE 6-continued

|  | Unit | Example No. | | | | |
| --- | --- | --- | --- | --- | --- | --- |
|  |  | E1 | E6 | E15 | E16 | E17 |
| Dual 85, Mw retention (at indicated aging time) | | | | | | |
| 336 h | % | 81 | 94 | 93 | 93 | 91 |
| 692 h | % | 66 | 85 | 83 | 83 | 80 |
| 1000 h | % | 54 | 75 | 74 | 75 | 70 |
| Dual 85, NII (23° C.) retention (at indicated aging time) | | | | | | |
| 336 h | % | 83 | 97 | 95 | 97 | 91 |
| 692 h | % | 41 | 92 | 88 | 90 | 83 |
| 1000 h | % | 7 | 78 | 76 | 76 | 75 |
| PTI, 600 V |  |  |  | 29 | 52 | 20 |

Examples E15 to E17 included IM-3, which has the same siloxane content as IM-1 but exhibits better hydrolytic stability. As can be seen in Table 6 with respect to E14 in comparison with E1, the composition including IM-3 (E15) demonstrated improved low temperature impact strength and significantly better hydrolytic stability than E1 (20% higher molecular weight retention than E1 and improved NII retention over E1). Increasing PC—Si-2 loading from 1% (E15) to 1.5% (E16) and 2% (E17) benefitted low tempera-ture impact performance. In addition, both E16 and E17 exhibited excellent FR performance, passing V0-0.8 mm. E16 further demonstrated passing electrical tracking performance at 600V.

The amounts of each component in the compositions of the following examples are reported as percent by weight relative to the total weight of the composition. In addition to the listed components, the compositions further contained 0.06 weight % PETS, 0.36 weight % of a stabilizer package, and 0.03 weight % TSAN.

The compositions of the following examples were prepared by pre-blending raw materials and extruding on a 37 mm Toshiba TEM-37BS twin screw extruder. Compositions were melt-kneaded, extruded, cooled through a water batch, and pelletized. Extruding conditions that were used are summarized in 7.

TABLE 7

| Extrusion | Unit | Set Values |
| --- | --- | --- |
| Zone 1 Temp | ° C. | 50 |
| Zone 2 Temp | ° C. | 180 |
| Zone 3 Temp | ° C. | 225 |
| Zone 4~11 Temp | ° C. | 245 |
| Die Temp | ° C. | 255 |
| Screw speed | rpm | 450 |
| Throughput | kg/hr | 30 |

Extruded pellets were molded before testing for NII, optical, and FR characteristics. Extruded pellets were dried at 120° C. for three hours. Samples were molded in a FANUC or Netstal molding machine. Molding conditions that were used in the injection molding machines are summarized in Table 3.

Examples CE1a and E2a to E6a

Examples E1a to E6a were prepared according to Table 8, and were characterized according to methods described above. Results are shown in Table 8.

TABLE 8

|  | Unit | Example No. | | | | | |
| --- | --- | --- | --- | --- | --- | --- | --- |
|  |  | CE1a | E2a | E3a | E4a | E5a | E6a |
| Components | | | | | | | |
| PC-Br | % | 20 | 20 | 20 | 20 | 20 | 20 |
| PC-1 | % | 20 | 20 | 20 | 20 | 20 | 20 |
| PC-2 | % | 51.04 | 51.04 | 50.04 | 50.54 | 49.54 | 49.04 |
| PC-Si-60 | % | 0 | 1 | 1 | 1.5 | 1.5 | 2 |
| IM-Si | % | 5 | 5 | 5 | 5 | 5 | 5 |
| IM-block | % | 3 | 2 | 3 | 2 | 3 | 3 |
| Carbon black | % | 0.2 | 0.2 | 0.2 | 0.2 | 0.2 | 0.2 |
| Properties | | | | | | | |
| PTI, 600 V | Drops | 87 | 64 | 76 | 81 | 66 | 41 |
| NII, 23° C. | J/m | 705 | 712 | 707 | 688 | 709 | 716 |
| Ductility, 23° C. | % | 100 | 100 | 100 | 100 | 100 | 100 |
| NII, −30° C. | J/m | 458 | 577 | 582 | 606 | 657 | 635 |
| Ductility, −30° C. | % | 60 | 100 | 100 | 100 | 100 | 100 |
| NII, −40° C. | J/m | 249 | 292 | 322 | 339 | 516 | 623 |
| Ductility, −40° C. | % | 0 | 0 | 0 | 0 | 60 | 100 |
| V0- 0.8 mm, normal conditioning |  | Marginal | Pass | Marginal | Pass | Pass | Pass |

*Comparative

Table 8 shows the effect of varying the amount of PC—Si-60 and IM-block (SEBS) in the composition. Examples E2a to E6a, which included 1 to 2% PC—Si-60, exhibited good impact resistance at −30° C., as shown by 100% ductility and NII greater than 500 J/m. In addition, examples E2a to E5a, which included 1 to 1.5% PC—Si, exhibited good tracking resistance, having a passing PTI at 600V result. Examples E2a and E4a to E6a further exhibited excellent FR performance. As can be seen by comparing examples CE1a, E3a, E5a, and E6a, low-temperature NII and FR performance improved with increased PC—Si-60 loading. Increasing the IM-block (SEBS) loading from 2% to 3%, illustrated in examples E2a compared with E3a, benefitted low-temperature impact performance but detrimentally impacted FR performance in example E3a. However, FR performance was maintained if lower PC—Si loading was used, as illustrated in example E4 compared with E5a.

Examples E6a to E11a

Examples E6a to E11a were prepared according to Table 9, and were characterized according to methods described above. Results are shown in Table 9.

impacted PTI performance but did not significantly affect low-temperature impact properties and FR performance. Decreasing SEB loading from 3% to 2%, as is seen in comparison of example E7 to E10, worsened PTI and low-temperature impact performance at −40° C. As is shown in E9a, using 0.38% loading of organic dyes to achieve black color resulted in PTI at 600V pass. Example E11a had an

TABLE 9

|  | Unit | Ex. No. | | | | | |
| --- | --- | --- | --- | --- | --- | --- | --- |
|  |  | E6a | E7a | E8a | E9a | E10a | E11a |
| Components | | | | | | | |
| Br PC | % | 20 | 20 | 20 | 20 | 20 | 20 |
| PC-1 | % | 20 | 20 | 20 | 20 | 20 | 69.04 |
| PC-2 | % | 49.04 | 49.04 | 49.04 | 49.04 | 50.04 | 0 |
| PC-Si-60 | % | 2 | 2 | 2 | 2 | 2 | 2 |
| IM-Si | % | 5 | 5 | 5 | 5 | 5 | 5 |
| IM-BLOCK | % | 3 | 3 | 3 | 3 | 2 | 3 |
| Carbon black | % | 0.2 |  | 0.5 |  |  |  |
| Organic dyes |  |  |  |  | 0.38 |  |  |
| Properties | | | | | | | |
| PTI |  | 41 | 60 | 31 | 73 | 45 | 67 |
| NII, 23° C. | J/m | 716 | 880 | 694 | 668 | 806 | 609 |
| Ductility, 23° C. | % | 100 | 100 | 100 | 100 | 100 | 100 |
| NII, −30° C. | J/m | 635 | 653 | 689 | 557 | 828 | 430 |
| Ductility, −30° C. | % | 100 | 100 | 100 | 100 | 100 | 20 |
| NII, −40° C. | J/m | 623 | 751 | 611 | 420 | 568 | 251 |
| Ductility, −40° C. | % | 100 | 100 | 100 | 60 | 100 | 0 |
| V0, 0.8 mm, normal conditioning |  | pass | marginal | pass | marginal |  |  |

As is shown in Table 9, each of examples E6a to E11a contained 2% PC—Si. Reducing carbon black from 0.2% to 0%, as is illustrated by comparing E6a to E7a, resulted in PTI at 600V pass and improved low-temperature impact properties and good but slightly less robust V0 at 0.8 mm thickness. Increasing carbon black from 0.2 wt % to 0.5 wt %, as is seen in comparison of E6a to E8a, detrimentally increased amount of high flow polycarbonate (PC-1) and resulted in significantly worse impact performance in comparison with example E7.

Examples E8a and E12a to E15a

Examples E8a and E12a to E15a were prepared according to Table 10 and were characterized according to methods described above. Results are shown in Table 10.

TABLE 10

|  | Units | Example No. | | | | | |
| --- | --- | --- | --- | --- | --- | --- | --- |
|  |  | E8a | E12a | E13a | E14a | E15a | E16a |
| Component | | | | | | | |
| Br PC | % | 20 | 20 | 20 | 20 | 20 | 20 |
| PC-1 | % | 20 | 32 | 32 | 32 | 32 | 20 |
| PC-2 | % | 49.04 | 37.04 | 38.54 | 39.04 | 38.04 | 49.79 |
| PC-Si-60 | % | 2 | 2 | 2 | 2 | 3 |  |
| PC-Si-40 |  |  |  |  |  |  | 2.25 |
| PETS | % | 0.3 | 0.3 | 0.3 | 0.3 | 0.3 | 0.3 |
| IM-Si-1 | % | 5 | 5 | 5 | 3 | 3 | 5 |
| IM-Block | % | 3 | 3 | 1.5 | 3 | 3 | 2 |
| Carbon Black | % | 0.5 | 0.5 | 0.5 | 0.5 | 0.5 |  |
| Properties | | | | | | | |
| PTI |  | 31 | 53 | 36 | 12 | 16 | 56 |
| NII, 23° C. | J/m | 694 | 704 | 697 | 707 | 741 | 739 |
| Ductility, 23° C. | % | 100 | 100 | 100 | 100 | 100 | 100 |
| NII, −30° C. | J/m | 689 | 661 | 637 | 691 | 661 | 632 |
| Ductility, −30° C. | % | 100 | 100 | 100 | 100 | 100 | 100 |
| NII, −40° C. | J/m | 611 | 480 | 487 | 302 | 527 | 386 |
| Ductility, −40° C. | % | 100 | 40 | 40 | 0 | 60 | 100 |
| V0 0.8 mm, normal conditioning |  | pass | pass | pass | pass | pass | pass |

As is shown in Table 10, increasing the higher flow PC-1 as in E12a compared to E8a benefitted PTI performance. Reduced SEBS loading as in E13a compared to E8a and E12a had no significant effect on PTI. Decreasing the amount of IM-Si-1 as in E14a and E15a resulted in decreased PTI performance compared to E8a, E12a, and E13a. Examples E8a and E12a to E17a each demonstrated good FR performance.

Figure 1B:
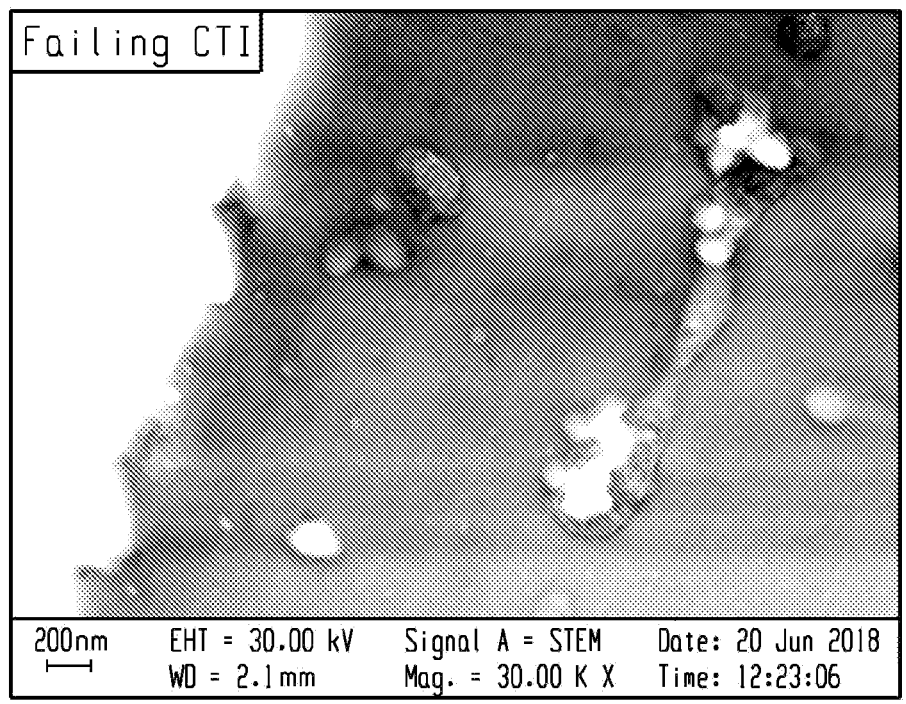

FIG. 1A and FIG. 1B are STEM morphological images at 30,000 magnification of the surface (within 10 micrometer of the outer surface) of molded plaques that pass CTI (Ex. 16a; FIG. 1A) and that fail CTI (Ex. 15a; FIG. 1B). The passing CTI sample clearly shows SEBS domains in strong interfacial interaction or association with the core-shell acrylic impact modifier. This phenomenon is not observed in the failing CTI sample. The synergistic association in the passing CTI plaque between the SEBS and core-shell acrylic impact modifiers forms a network, and without being bound by theory, is believed to provide compatibility to the blend, thereby yielding the improved impact properties and electrical properties. The failing CTI electrical performance example shows no significant network between the impact modifiers and instead shows evidence of acrylic and SEBS agglomeration.

Figure 2A:
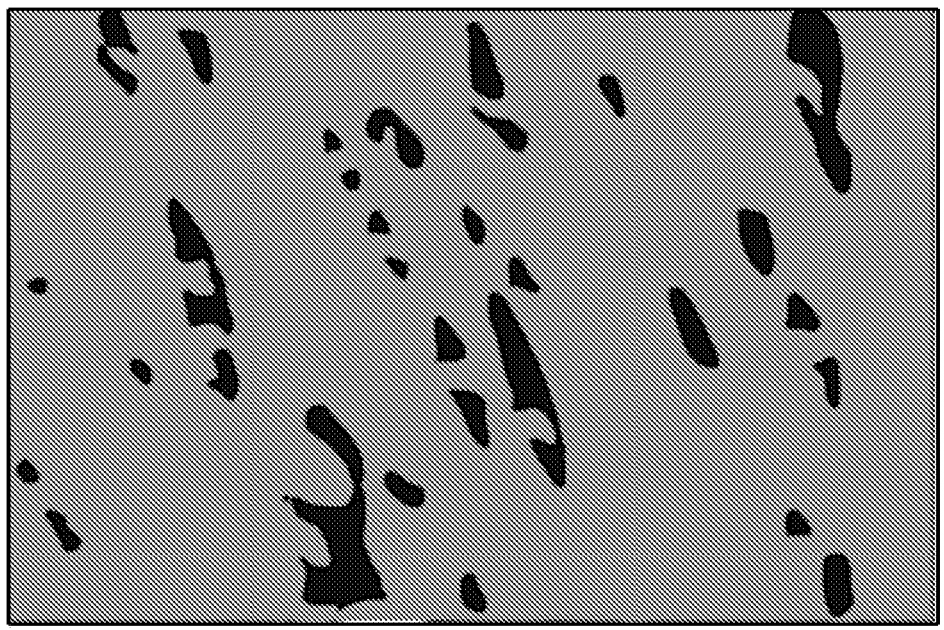
FIG. 2A and FIG. 2B are of the bulk of a molded plaque with a passing CTI, where
Figure 2B:
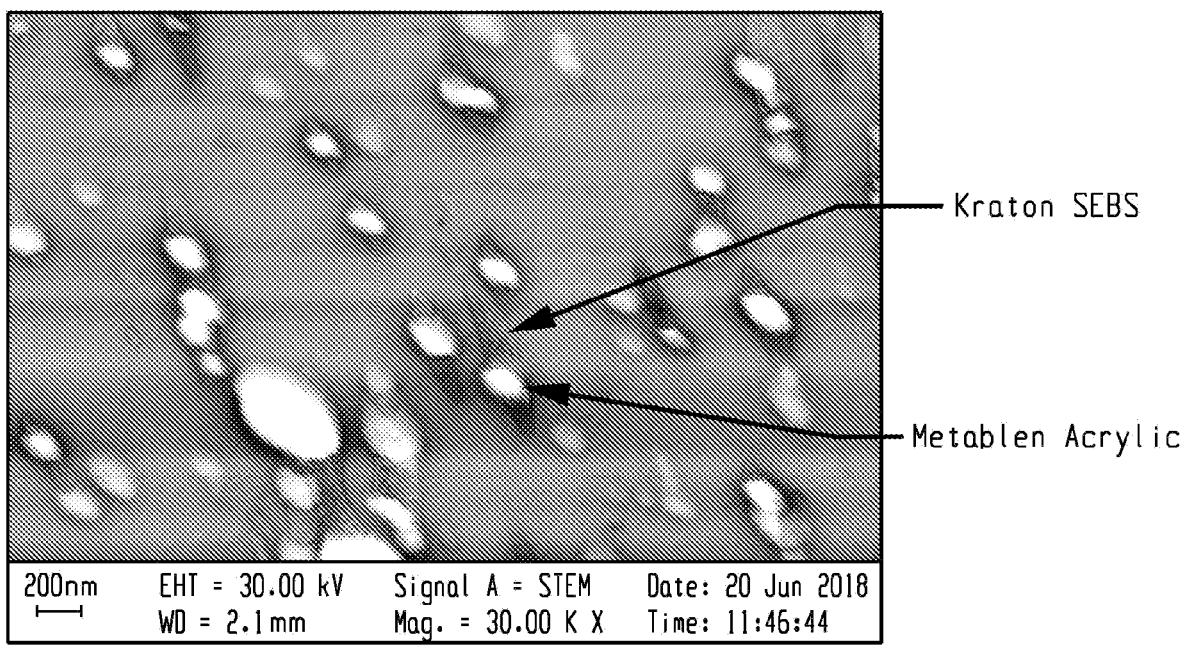
Figure 3A:
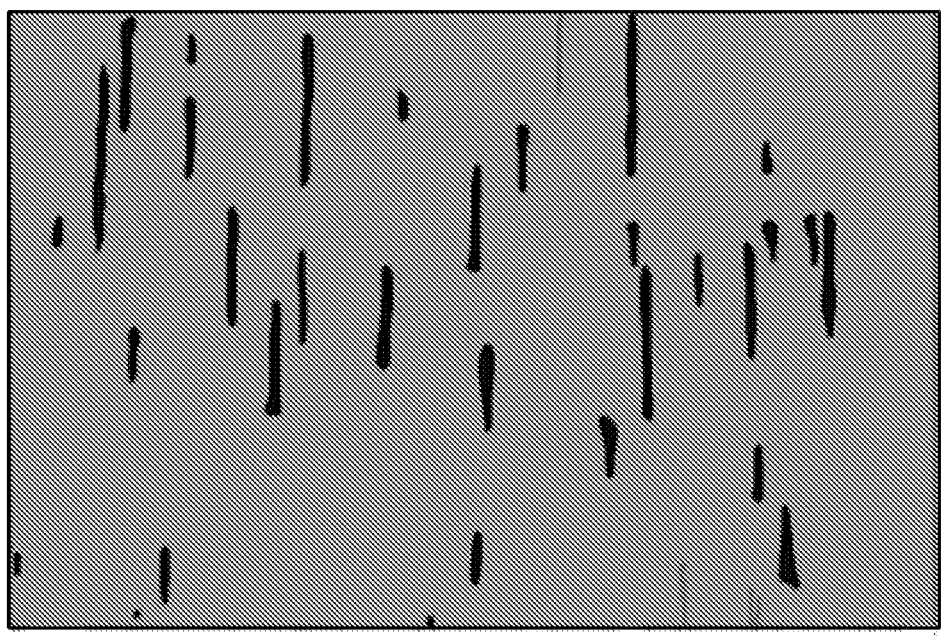
FIG. 3A and FIG. 3B are of the surface of a molded plaque with a passing CTI, where
Figure 3B:
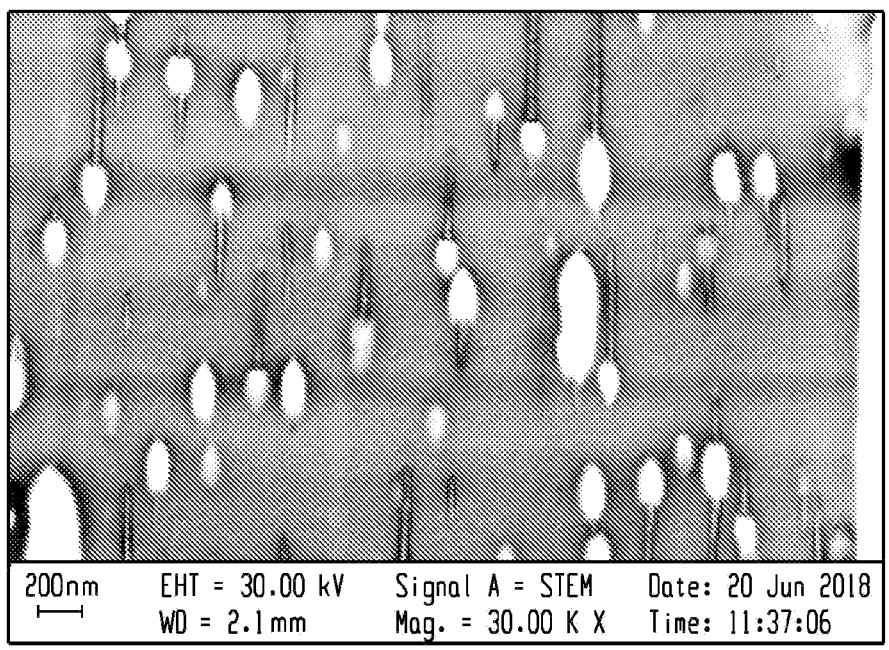

FIGS. 2A and 2B show the domain size and shape for the bulk passing CTI plaque, where FIG. 2A is the image analysis output of FIG. 3B. FIGS. 3A and 3B show the domain size and shape for the bulk passing CTI plaque, where FIG. 3A is the image analysis output of FIG. 3B, which shows the domain size and shape for the surface (top 10 micrometers) of the passing CTI plaque. The statistical comparison of SEBS and core-shell acrylic domains from the failing and passing CTI samples shows significant statistical difference in aspect ratio (median comparison for non-normal distributions).

This disclosure further encompasses the following aspects.

Aspect 1. A polycarbonate composition comprising 60 to 80 wt % of a polycarbonate component; 10 to 30 wt % of a brominated polycarbonate different from the polycarbonate; 0.5 to 5 wt % of a poly(carbonate-siloxane) comprising 30 to 80 wt % of siloxane blocks; 1 to 10 wt % of a core-shell silicone (meth)acrylate impact modifier comprising a silicone elastomer core and an MMA copolymer shell; and 2 to 3 wt % of an alkenyl aromatic-olefin block copolymer impact modifier; wherein the wt % of each component is based on the total weight of the composition, which totals 100 wt %.

Aspect 2. The composition of any one or more of the preceding aspects, wherein a molded sample of the composition retains at least 90 percent Mw after 336 hours in a hydrolytic chamber at 85° C. and 85 percent relative humidity.

Aspects 3. The composition of any one or more of the preceding aspects, wherein a molded sample of the composition retains greater than 85 percent Mw after 692 hours in a hydrolytic chamber at 85° C. and 85 percent relative humidity.

Aspect 4. The composition of any one or more of the preceding aspects, wherein the composition retains greater than 75% Mw after 1000 hours in a hydrolytic chamber at 85° C. and 85% relative humidity.

Aspect 5. The composition of any one or more of the preceding aspects, wherein a molded sample of the composition retains at least 80 percent notched Izod impact strength measured at 23° C. according to ASTM D256 after 336 hours in a hydrolytic chamber at 85° C. and 85 percent relative humidity, preferably wherein a molded sample of the composition retains at least 90 percent notched Izod impact strength measured at 23° C. according to ASTM D256 after 336 hours in a hydrolytic chamber at 85° C. and 85 percent relative humidity.

Aspect 6. The composition of any one or more of the preceding aspects, wherein a molded sample of the composition retains at least 65 percent notched Izod impact strength measured at 23° C. according to ASTM D256 after 692 hours in a hydrolytic chamber at 85° C. and 85 percent relative humidity, preferably wherein a molded sample of the composition retains at least 90 percent notched Izod impact strength measured at 23° C. according to ASTM D256 after 692 hours in a hydrolytic chamber at 85° C. and 85 percent relative humidity.

Aspect 7. The composition of any one or more of the preceding aspects, wherein a molded sample of the composition retains at least 50 percent notched Izod impact strength measured at 23° C. according to ASTM D256 after 1000 hours in a hydrolytic chamber at 85° C. and 85 percent relative humidity, preferably wherein a molded sample of the composition retains at least 75 percent notched Izod impact strength measured at 23° C. according to ASTM D256 after 1000 hours in a hydrolytic chamber at 85° C. and 85 percent relative humidity.

Aspect 8. The composition of any one or more of the preceding aspects, wherein a molded sample of the composition does not show tracking after at least 50 drops of an aqueous 0.1% ammonium chloride solution measured at 600 V determined according to ASTM D-3638.

Aspect 9. The composition of any one or more of the preceding aspects, wherein a molded sample of the composition having a thickness of 3.2 millimeters has a notched Izod impact strength of greater than 500 Joules/meter and a ductility of 100% measured according to ASTM D256 at a temperature of −30° C., preferably wherein a molded sample of the composition having a thickness of 3.2 millimeters has a notched Izod impact strength of greater than 600 Joules/meter and a ductility of 100% measured according to ASTM D256 at a temperature of −30° C.

Aspect 10. The composition of any one or more of the preceding aspects, wherein a molded sample of the composition having a thickness of 3.2 millimeters has a notched Izod impact strength of greater than 500 Joules/meter and a ductility of 100% measured according to ASTM D256 at a temperature of −40° C.

Aspect 11. The composition of any one or more of the preceding aspects, wherein a molded sample of the composition having a thickness of 0.8 millimeters has a UL94 flame retardance rating of V0.

Aspect 12. The composition of any one or more of the preceding aspects, wherein the polycarbonate comprises a bisphenol A homopolycarbonate; preferably wherein the polycarbonate comprises a first bisphenol A homopolycarbonate having a weight average molecular weight of 21,000 to 31,000 Da in an amount of 15 to 45 wt %, based on the total weight of the composition and a second bisphenol A homopolycarbonate having a weight average molecular weight of 29,900 to 31,000 Da in an amount of 40 to 70 wt %, based on the total weight of the composition.

Aspect 13. The composition of any one or more of the preceding aspects, wherein the brominated polycarbonate comprises brominated bisphenol A having a bromine content of 24 to 27.5 wt %, relative to the total weight of the brominated polycarbonate.

Aspect 14. The composition of any one or more of the preceding aspects, wherein the poly(carbonate-siloxane) is an elastomer comprising carbonate blocks having a glass transition temperature greater than 70° C. and siloxane blocks having a glass transition temperature of minus 130 to minus 50° C.; a weight average molecular weight of 10,000 to 100,000 Da; at least 30% elongation before yield as measured by ASTM D638; and a Shore D hardness of 5 to 20 as measured by ASTM D2240.

Aspect 15. The composition of any one or more of the preceding aspects, wherein the poly(carbonate-siloxane) is a poly(bisphenol A carbonate-dimethyl siloxane) elastomer.

Aspect 16. The composition of any one or more of the preceding aspects, wherein the core-shell silicone-(meth) acrylate elastomer is a dimethylsiloxane-methyl methacrylate copolymer having a particle size of 200 to 400 nm.

Aspect 17. The composition of any one or more of the preceding aspects, wherein the core-shell silicone-(meth) acrylate elastomer is a dimethylsiloxane-methyl methacrylate copolymer having a particle size of greater than 400 nm.

Aspect 18. The composition of any one or more of the preceding aspects, wherein the alkenyl aromatic-olefin block copolymer is a styrene-ethylene/butylene-styrene block copolymer, present in an amount of 2 to 3 wt %, based on the total weight of the composition.

Aspect 19. The composition of any one or more of the preceding aspects further comprising 0.01 to 2 wt % of an anti-drip agent, based on the total weight of the composition.

Aspect 20. The composition of any one or more of the preceding aspects, wherein the anti-drip agent is a poly (tetrafluoroethylene)-encapsulated styrene-acrylonitrile.

Aspect 21. The composition of any one or more of the preceding aspects, further comprising a heat stabilizer, an ultraviolet light stabilizer, a mold release agent, a lubricant, a processing aid, a dye, a pigment, or a combination comprises at least one of the foregoing.

Aspect 22. The composition of any one or more of the preceding embodiments, further comprising a black colorant, preferably comprising 0.1 to 0.5 wt % of carbon black, based on the total weight of the composition, or 0.1 to 0.5 wt % of organic dyes, each based on the total weight of the composition.

Aspect 23. The composition of any one or more of the preceding aspects, further comprising 0.1 to 0.5 wt % pentaerythritol tetrastearate, based on the total weight of the composition.

Aspect 24. The composition of any one or more of the preceding aspects, further comprising 0.01 to 0.5 wt % of a mold release agent, 0.01 to 5 wt % of a heat stabilizer, and 0.01 to 5 wt % of a light stabilizer.

Aspect 25. The composition of any one or more of the preceding aspects, comprising: 65 to 75 wt % of the polycarbonate, wherein the polycarbonate comprises a first bisphenol A homopolycarbonate having a weight average molecular weight of 21,000 to 23,000 Da in an amount of 15 to 30 wt %, and a second bisphenol A homopolycarbonate having a weight average molecular weight of 29,900 to 31,000 Da in an amount of 40 to 60 wt %; 15 to 25 wt % of a brominated polycarbonate comprising brominated bisphenol A; 0.1 to 5 wt %, or 2 to 5 wt % of a poly(bisphenol A carbonate-dimethyl siloxane) elastomer comprising 60 to 80 wt % of dimethylsiloxane blocks; 3 to 5 wt % of a core-shell dimethylsiloxane-methyl methacrylate copolymer impact modifier having a silicon elastomer core and a methyl methacrylate shell, having a particle size of at least 200 nm, preferably 200 to 400 nm or greater than 400 nm; 3 to 5 wt % of a styrene-ethylene/butylene-styrene block copolymer; 0.1 to 0.5 wt % of a poly(tetrafluoroethylene)-encapsulated styrene-acrylonitrile; 0.1 to 0.5 wt % of a black colorant; and 0.1 to 1 wt % of an ultraviolet light stabilizer, 0.01 to 1 wt % of a poly(tetrafluoroethylene)-encapsulated styrene-acrylonitrile, and 0.01 to 3 wt % of a phosphite stabilizer.

Aspect 26. The composition of the preceding aspect, wherein a molded sample of the composition retains at least 90 percent Mw after 336 hours in a hydrolytic chamber at 85° C. and 85 percent relative humidity; wherein a molded sample of the composition retains greater than 85 percent Mw after 692 hours in a hydrolytic chamber at 85° C. and 85 percent relative humidity; wherein the composition retains greater than 75% Mw after 1000 hours in a hydrolytic chamber at 85° C. and 85% relative humidity; wherein a molded sample of the composition retains at least 80 percent notched Izod impact strength measured at 23° C. according to ASTM D256 after 336 hours in a hydrolytic chamber at 85° C. and 85 percent relative humidity; a molded sample of the composition retains at least 65 percent notched Izod impact strength measured at 23° C. according to ASTM D256 after 692 hours in a hydrolytic chamber at 85° C. and 85 percent relative humidity; wherein a molded sample of the composition retains at least 50 percent notched Izod impact strength measured at 23° C. according to ASTM D256 after 1000 hours in a hydrolytic chamber at 85° C. and 85 percent relative humidity; wherein a molded sample of the composition does not show tracking after at least 50 drops of an aqueous 0.1% ammonium chloride solution measured at 600 V determined according to ASTM D-3638; and a molded sample of the composition having a thickness of 0.8 millimeters has a UL94 flame retardance rating of V0.

Aspect 27. An article comprising the composition of any one or more of the preceding aspects, wherein the article is a molded article, a thermoformed article, an extruded film, an extruded sheet, one or more layers of a multi-layer article, a substrate for a coated article, and a substrate for a metallized article.

Aspect 28. The article of the preceding aspect, wherein the article is a solar apparatus, an electrical junction box, an electrical connector, an electrical vehicle charger, an outdoor electrical enclosure, a smart meter enclosure, a smart grid power node, a photovoltaic frame or a miniature circuit breaker.

Other aspects include the following:

Embodiment 1a. A polycarbonate composition comprising: 60 to 80 wt % of a polycarbonate component; 10 to 30 wt % of a brominated polycarbonate different from the polycarbonate; 0.5 to 5 wt % of a poly(carbonate-siloxane) comprising greater than 30 to 70 wt % of siloxane blocks; 1 to 10 wt % of a core-shell silicone-(meth)acrylate impact modifier; 0.5 to 5 wt % of an alkenyl aromatic-olefin block copolymer impact modifier; and 0.01 to 2 wt % of an anti-drip agent; wherein the wt % of each component is based on the total weight of the composition, which totals 100 wt %.

Aspect 2a. The composition of aspect 1a, wherein a molded sample of the composition does not show tracking after at least 50 drops of an aqueous 0.1% ammonium chloride solution measured at 600 V as determined by ASTM D-3638-85.

Aspect 3a. The composition of any one or more of the preceding aspects, wherein a molded sample of the composition having a thickness of 3.2 millimeters has a notched Izod impact strength of greater than 500 Joules/meter and a ductility of 100% measured according to ASTM D256 at a temperature of −30° C., preferably wherein a molded sample of the composition having a thickness of 3.2 millimeters has a notched Izod impact strength of greater than 600 Joules/ meter and a ductility of 100% measured according to ASTM D256 at a temperature of −30° C.

Aspect 4a. The composition of any one or more of the preceding aspects, wherein a molded sample of the composition having a thickness of 3.2 millimeters has a notched Izod impact strength of greater than 500 Joules/meter and a ductility of 100% measured according to ASTM D256 at a temperature of −40° C.

Aspect 5a. The composition of any one or more of the preceding aspects, wherein a molded sample of the composition having a thickness of 0.8 millimeters has a UL94 flame retardance rating of V0.

Aspect 6a. The composition of any one or more of the preceding aspects, wherein the polycarbonate comprises a bisphenol A homopolycarbonate; preferably wherein the polycarbonate comprises a first bisphenol A homopolycarbonate having a weight average molecular weight of 21,000 to 23,000 Da in an amount of 15 to 45 wt %, based on the total weight of the composition and a second bisphenol A homopolycarbonate having a weight average molecular weight of 29,900 to 31,000 Da in an amount of 40 to 70 wt %, based on the total weight of the composition.

Aspect 7a. The composition of any one or more of the preceding aspects, wherein the brominated polycarbonate has a bromine content of 24 to 27.5 wt %, relative to the total weight of the brominated polycarbonate, preferably wherein the brominated polycarbonate comprises brominated bisphenol A polycarbonate units.

Aspect 8a. The composition of any one or more of the preceding aspects, wherein the poly(carbonate-siloxane) is an elastomer having carbonate blocks having a glass transition temperature greater than 70° C. and siloxane blocks having a glass transition temperature of minus 130 to minus 50° C.; a weight average molecular weight of 10,000 to 100,000 Da; at least 30% elongation before yield as measured by ASTM D638; and a Shore D hardness of 5 to 20 as measured by ASTM D2240.

Aspect 9a. The article of any one or more of the preceding aspects, wherein the poly(carbonate-siloxane) is a poly (bisphenol A carbonate-dimethylsiloxane) elastomer.

Aspect 10a. The composition of any one or more of the preceding aspects, wherein the core-shell silicone-(meth) acrylate elastomer is a dimethylsiloxane-methyl methacrylate copolymer, present in an amount of 1 to 5 wt %, based on the total weight of the composition.

Aspect 11a. The composition of any one or more of the preceding aspects, wherein the alkenyl aromatic-olefin block copolymer is a styrene-ethylene/butylene-styrene block copolymer, present in an amount of 2 to 3 wt %, based on the total weight of the composition.

Aspect 12a. The composition of any one or more of the preceding aspects, wherein the anti-drip agent is a poly (tetrafluoroethylene)-encapsulated styrene-acrylonitrile.

Aspect 13a. The composition of any one or more of the preceding aspects, further comprising a heat stabilizer, an ultraviolet light stabilizer, a mold release agent, a lubricant, a processing aid, a dye, a pigment, or a combination thereof.

Aspect 14a. The composition of any one or more of the preceding aspects, further comprising a black colorant, preferably comprising 0.1 to 0.5 wt % of carbon black, or 0.1 to 0.5 wt % of organic dyes, each based on the total weight of the composition.

Aspect 15a. The composition of any one or more of the preceding aspects, further comprising 0.01 to 0.5 wt % of a mold release agent, 0.01 to 5 wt % of a heat stabilizer, and 0.01 to 5 wt % of a light stabilizer.

Aspect 16a. The composition of any one or more of the preceding aspects, comprising: 65 to 75 wt % of the polycarbonate, wherein the polycarbonate comprises a first bisphenol A homopolycarbonate having a weight average molecular weight of 21,000 to 23,000 Da in an amount of 15 to 30 wt %, and a second bisphenol A homopolycarbonate having a weight average molecular weight of 29,900 to 31,000 Da in an amount of 40 to 60 wt %; 15 to 25 wt % of a brominated bisphenol A polycarbonate; 0.8 to 3 wt % of a poly(bisphenol A carbonate-dimethylsiloxane) elastomer comprising 60 to 80 wt % of dimethylsiloxane blocks; 3 to 5 wt % of a core-shell dimethylsiloxane-methyl methacrylate copolymer impact modifier; 1 to 5 wt % of a styrene-ethylene/butylene-styrene block copolymer; 0.1 to 0.5 wt % of a poly(tetrafluoroethylene)-encapsulated styrene-acrylonitrile; and 0.1 to 3 wt % of a combination of a colorant, a mold release agent, a heat stabilizer, and an ultraviolet light stabilizer.

Aspect 17a. The composition of aspect 16a, wherein a molded sample of the composition does not show tracking after at least 50 drops of an aqueous 0.1% ammonium chloride solution measured at 600 V as determined by ASTM D-3638-85; wherein a molded sample of the composition having a thickness of 3.2 millimeters has a notched Izod impact strength of greater than 500 Joules/meter and a ductility of 100% measured according to ASTM D256 at a temperature of −30° C.; a molded sample of the composition having a thickness of 3.2 millimeters has a tensile strength greater than or equal to 55 megapascal determined according to ASTM D638; a molded sample of the composition having a thickness of 3.2 millimeters has a tensile modulus of greater than or equal to 2 gigapascal determined according to ASTM method D638; and a molded sample of the composition having a thickness of 0.8 millimeters has a UL94 flame retardance rating of V0.

Aspect 18a. An article comprising the composition of any one or more of the preceding aspects, wherein the article is a molded article, a thermoformed article, an extruded film, an extruded sheet, one or more layers of a multi-layer article, a substrate for a coated article, and a substrate for a metallized article.

Aspect 19a. The article of aspect 18a, wherein the article is a solar apparatus, an electrical junction box, an electrical connector, an electrical vehicle charger, an outdoor electrical enclosure, a smart meter enclosure, a smart grid power node, a photovoltaic frame or a miniature circuit breaker.

Aspect 20a. A method of controlling the tracking of an electrical current of an article, the method comprising providing a composition of any one or more of aspects 1a to 17a, and forming the composition to provide the article of manufacture.

Still other aspects are as follows.

Aspect 1b. A polycarbonate composition comprising: a continuous phase comprising a polycarbonate component; discontinuous first domains distributed in the continuous phase, and comprising a core-shell silicone-(meth)acrylate impact modifier comprising a silicone elastomer core and a (meth)acrylate copolymer shell, wherein the first domains have an aspect ratio of at least 1.7, preferably at least 1.8; and discontinuous second domains distributed in the continuous phase, and comprising an alkenyl aromatic-olefin block copolymer impact modifier, wherein the second domains have an aspect ratio of at least 3, preferably at least 4, and a domain size of 6400 square nanometers or less, more preferably 5700 square nanometers or less; each as determined by scanning transmission electron microscopy of an outer surface of a molded sample, within 10 micrometers of the outer surface.

Aspect 2b. The polycarbonate composition of aspect 1, wherein a molded sample of the composition does not show tracking after at least 50 drops of an aqueous 0.1% ammonium chloride solution measured at 600 V as determined by ASTM D-3638-85; and a molded sample of the composition having a thickness of 3.2 millimeters has at least one of the following properties: a notched Izod impact strength of greater than 500 Joules/meter and a ductility of 100% measured according to ASTM D256 at a temperature of −30° C.; a notched Izod impact strength of greater than 600 Joules/meter and a ductility of 100% measured according to ASTM D256 at a temperature of −30° C.; or a notched Izod impact strength of greater than 500 Joules/meter and a ductility of 100% measured according to ASTM D256 at a temperature of −40° C.

Aspect 3b. The polycarbonate composition of aspect 1b or 2b, comprising: 60 to 80 wt % of a polycarbonate; 10 to 30 wt % of a brominated polycarbonate different from the polycarbonate; 0.5 to 5 wt % of a poly(carbonate-siloxane) comprising 30 to 70 wt % of siloxane blocks; 1 to 10 wt % of a core-shell silicone-(meth)acrylate impact modifier comprising a silicone elastomer core and an MMA copolymer shell; and 0.5 to 5 wt % of an alkenyl aromatic-olefin block copolymer impact modifier; wherein the wt % of each component is based on the total weight of the composition, which totals 100 wt %, preferably wherein a molded sample of the composition does not show tracking after at least 50 drops of an aqueous 0.1% ammonium chloride solution measured at 600 V determined according to ASTM D-3638.

Aspect 4b. The composition of any one or more of the preceding aspects, further comprising 0.01 to 2 wt % of an anti-drip agent, preferably wherein the anti-drip agent is a poly(tetrafluoroethylene)-encapsulated styrene-acrylonitrile.

Aspect 6b. The composition of any one or more of the preceding aspects, comprising 2 to 3 wt % of an alkenyl aromatic-olefin block copolymer impact modifier, based on the total weight of the composition, preferably wherein the alkenyl aromatic-olefin block copolymer is a styrene-ethylene/butylene-styrene block copolymer.

Aspect 7b. The composition of any one or more of the preceding aspects, having at least one of the following properties: a molded sample of the composition retains at least 90 percent Mw after 336 hours in a hydrolytic chamber at 85° C. and 85 percent relative humidity; a molded sample of the composition retains greater than 85 percent Mw after 692 hours in a hydrolytic chamber at 85° C. and 85 percent relative humidity; the composition retains greater than 75% Mw after 1000 hours in a hydrolytic chamber at 85° C. and 85% relative humidity.

Aspect 8b. The composition of any one or more of the preceding aspects, having at least one of the following properties: a molded sample of the composition retains at least 80 percent notched Izod impact strength measured at 23° C. according to ASTM D256 after 336 hours in a hydrolytic chamber at 85° C. and 85 percent relative humidity, a molded sample of the composition retains at least 90 percent notched Izod impact strength measured at 23° C. according to ASTM D256 after 336 hours in a hydrolytic chamber at 85° C. and 85 percent relative humidity; a molded sample of the composition retains at least 65 percent notched Izod impact strength measured at 23° C. according to ASTM D256 after 692 hours in a hydrolytic chamber at 85° C. and 85 percent relative humidity; a molded sample of the composition retains at least 90 percent notched Izod impact strength measured at 23° C. according to ASTM D256 after 692 hours in a hydrolytic chamber at 85° C. and 85 percent relative humidity; wherein a molded sample of the composition retains at least 50 percent notched Izod impact strength measured at 23° C. according to ASTM D256 after 1000 hours in a hydrolytic chamber at 85° C. and 85 percent relative humidity, or a molded sample of the composition retains at least 75 percent notched Izod impact strength measured at 23° C. according to ASTM D256 after 1000 hours in a hydrolytic chamber at 85° C. and 85 percent relative humidity.

Aspect 9b. The composition of any one or more of the preceding aspects, wherein a molded sample of the composition does not show tracking after at least 50 drops of an aqueous 0.1% ammonium chloride solution measured at 600 V determined according to ASTM D-3638.

Aspect 10b. The composition of any one or more of the preceding aspects, wherein a molded sample of the composition having a thickness of 3.2 millimeters has at least one of the following properties: a notched Izod impact strength of greater than 500 Joules/meter and a ductility of 100% measured according to ASTM D256 at a temperature of −30° C.; a notched Izod impact strength of greater than 600 Joules/meter and a ductility of 100% measured according to ASTM D256 at a temperature of −30° C.; or a notched Izod impact strength of greater than 500 Joules/meter and a ductility of 100% measured according to ASTM D256 at a temperature of −40° C.

Aspect 11b. The composition of any one or more of the preceding aspects, wherein a molded sample of the composition having a thickness of 0.8 millimeters has a UL94 flame retardance rating of V0.

Aspect 12b. The composition of any one or more of the preceding aspects, wherein the polycarbonate comprises a bisphenol A homopolycarbonate; preferably wherein the polycarbonate comprises a first bisphenol A homopolycarbonate having a weight average molecular weight of 21,000 to 23,000 Da in an amount of 15 to 45 wt %, based on the total weight of the composition and a second bisphenol A homopolycarbonate having a weight average molecular weight of 29,000 to 31,000 Da in an amount of 40 to 70 wt %, based on the total weight of the composition.

Aspect 13b. The composition of any one or more of the preceding aspects, wherein the core-shell silicone-(meth) acrylate elastomer is a dimethylsiloxane-methyl methacrylate copolymer having a particle size of 200 to 400 nm or a particle size of greater than 400 nm.

Aspect 14b. The composition of aspect 1, further comprising 0.01 to 2 wt % of an anti-drip agent, preferably wherein the anti-drip agent is a poly(tetrafluoroethylene)-encapsulated styrene-acrylonitrile.

Aspect 15b. The composition of any one or more of the preceding aspects, having a thickness of 3.2 millimeters has at least one of a notched Izod impact strength of greater than 500 Joules/meter and a ductility of 100% measured according to ASTM D256 at a temperature of −30° C.; a notched Izod impact strength of greater than 600 Joules/meter and a ductility of 100% measured according to ASTM D256 at a temperature of −30° C.; a notched Izod impact strength of greater than 500 Joules/meter and a ductility of 100% measured according to ASTM D256 at a temperature of −40° C.; or a UL94 flame retardance rating of V0.

Aspect 16b. The composition of any one or more of the preceding aspects, wherein the core-shell silicone-(meth) acrylate elastomer is a dimethylsiloxane-methyl methacrylate copolymer, present in an amount of 1 to 5 wt %, based on the total weight of the composition.

Aspect 17b. The composition of any one or more of the preceding aspects, comprising: 65 to 75 wt % of the polycarbonate, wherein the polycarbonate comprises a first bisphenol A homopolycarbonate having a weight average molecular weight of 21,000 to 23,000 Da in an amount of 15 to 30 wt %, and a second bisphenol A homopolycarbonate having a weight average molecular weight of 29,900 to 31,000 Da in an amount of 40 to 60 wt %; 15 to 25 wt % of a brominated bisphenol A polycarbonate; 0.8 to 3 wt % of a poly(bisphenol A carbonate-dimethylsiloxane) comprising 30 to 70 wt % of dimethylsiloxane blocks; 3 to 5 wt % of a core-shell dimethylsiloxane-methyl methacrylate copolymer impact modifier; 1 to 5 wt % of a styrene-ethylene/butylene-styrene block copolymer; 0.1 to 0.5 wt % of a poly(tetrafluoroethylene)-encapsulated styrene-acrylonitrile; and 0.1 to 3 wt % of a combination of a colorant, a mold release agent, a heat stabilizer, and an ultraviolet light stabilizer.

Aspect 18b. The composition of aspect 15b, wherein a molded sample of the composition does not show tracking after at least 50 drops of an aqueous 0.1% ammonium chloride solution measured at 600 V as determined by ASTM D-3638-85; wherein a molded sample of the composition having a thickness of 3.2 millimeters has a notched Izod impact strength of greater than 500 Joules/meter and a ductility of 100% measured according to ASTM D256 at a temperature of −30° C.; a molded sample of the composition having a thickness of 3.2 millimeters has a tensile strength greater than or equal to 55 megapascal determined according to ASTM D638; a molded sample of the composition having a thickness of 3.2 millimeters has a tensile modulus of greater than or equal to 2 gigapascal determined according to ASTM method D638; and a molded sample of the composition having a thickness of 0.8 millimeters has a UL94 flame retardance rating of V0.

Aspect 19b. The composition of any one or more of the preceding aspects, wherein a molded sample of the composition does not show tracking after at least 50 drops of an aqueous 0.1% ammonium chloride solution measured at 600 V as determined by ASTM D-3638-85.

Aspect 20b. The composition of any one or more of the preceding aspects, wherein the alkenyl aromatic-olefin block copolymer is a styrene-ethylene/butylene-styrene block copolymer, present in an amount of 2 to 3 wt %, based on the total weight of the composition.

Aspect 21b. The composition of any one or more of the preceding aspects, wherein the brominated polycarbonate comprises brominated bisphenol A having a bromine content of 24 to 27.5 wt %, relative to the total weight of the brominated polycarbonate, preferably wherein the brominated polycarbonate comprises brominated bisphenol A polycarbonate units.

Aspect 22b. The composition of any one or more of the preceding aspects, wherein the poly(carbonate-siloxane) elastomer is a poly(bisphenol A carbonate-dimethylsiloxane) elastomer, and has carbonate blocks having a glass transition temperature greater than 70° C. and siloxane blocks having a glass transition temperature of minus 130 to minus 50° C.; a weight average molecular weight of 10,000 to 100,000 Da; at least 30% elongation before yield as measured by ASTM D638; and a Shore D hardness of 5 to 20 as measured by ASTM D2240.

Aspect 23b. An article comprising the composition of any one or more of the preceding aspects, wherein the article is a molded article, a thermoformed article, an extruded film, an extruded sheet, one or more layers of a multi-layer article, a substrate for a coated article, or a substrate for a metallized article.

Aspect 24b. The article of aspect 23, wherein the article is a solar apparatus, an electrical junction box, an electrical connector, an electrical vehicle charger, an outdoor electrical enclosure, a smart meter enclosure, a smart grid power node, a photovoltaic frame or a miniature circuit breaker.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The singular forms "a," "an," and "the" include plural referents unless the context clearly dictates otherwise. "Or" means "and/or." A "combination" is inclusive of blends, mixtures, alloys, reaction products, and the like. The endpoints of all ranges directed to the same component or property are inclusive and independently combinable (e.g., ranges of "less than or equal to 25 wt % is inclusive of the endpoints and all intermediate values of the ranges of "5 wt % to 25 wt %," etc.). Disclosure of a narrower range or more specific group in addition to a broader range is not a disclaimer of the broader range or larger group. "Combination thereof" is open, including like elements not named.

Unless defined otherwise, technical and scientific terms used herein have the same meaning as is commonly understood by one of skill in the art to which this disclosure belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

All test methods referred to herein are those in effect as of the earliest filing date of this application, unless specifically indicated otherwise.

As used herein, the terms "hydrocarbyl" and "hydrocarbon" refer to a substituent comprising carbon and hydrogen, optionally with 1 to 3 heteroatoms, for example, oxygen, nitrogen, halogen, silicon, sulfur, or a combination thereof; "alkyl" means a straight or branched chain, saturated monovalent hydrocarbon group; "alkylene" means a straight or branched chain, saturated, divalent hydrocarbon group; "alkylidene" means a straight or branched chain, saturated divalent hydrocarbon group, with both valences on a single common carbon atom; "alkenyl" means a straight or branched chain monovalent hydrocarbon group having at least two carbons joined by a carbon-carbon double bond; "cycloalkyl" means a non-aromatic monovalent monocyclic or multicylic hydrocarbon group having at least three carbon atoms, "cycloalkenyl" means a non-aromatic cyclic divalent hydrocarbon group having at least three carbon atoms, with at least one degree of unsaturation; "aryl" means an aromatic monovalent group containing only carbon in the aromatic ring or rings; "arylene" means an aromatic divalent group containing only carbon in the aromatic ring or rings; "alkylarylene" means an arylene group that has been substituted with an alkyl group as defined above, with 4-methylphenylene being an exemplary alkylarylene group; "arylalkylene" means an alkyl group that has been substituted with an aryl group as defined above, with benzyl being an exemplary arylalkylene group; and the suffix "oxy" refers to any of the groups as defined above with the indicated number of carbon atoms attached through an oxygen bridge (—O—), with an exemplary -oxy group being an alkoxy such as methoxy.

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ arylalkylene having 1 to 3 separate or fused rings and from 6 to 18 ring carbon atoms; or arylalkylenoxy having 1 to 3 separate or fused rings and from 6 to 18 ring carbon atoms, with benzyloxy being an exemplary arylalkylenoxy.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polycarbonate composition comprising:
    a continuous phase comprising a polycarbonate component;
    discontinuous first domains distributed in the continuous phase, and comprising a core-shell silicone-(meth)acrylate impact modifier comprising a silicone elastomer core and a (meth)acrylate copolymer shell, wherein the first domains have an aspect ratio of at least 1.7; and
    discontinuous second domains distributed in the continuous phase, and comprising an alkenyl aromatic-olefin block copolymer impact modifier, wherein the second domains have an aspect ratio of at least 3, and a domain size of 6400 square nanometers or less;
    each as determined by scanning transmission electron microscopy of an outer surface of a molded sample, within 10 micrometers of the outer surface.

2. The composition of 1, wherein
    a molded sample of the composition does not show tracking after at least 50 drops of an aqueous 0.1% ammonium chloride solution measured at 600 V as determined by ASTM D-3638-85; and
    a molded sample of the composition having a thickness of 3.2 millimeters has at least one of the following properties:
        a notched Izod impact strength of greater than 500 Joules/meter and a ductility of 100% measured according to ASTM D256 at a temperature of −30° C.;
        a notched Izod impact strength of greater than 500 Joules/meter and a ductility of 100% measured according to ASTM D256 at a temperature of −40° C.

3. The composition of claim 1, comprising:
    60 to 80 weight percent of a polycarbonate;
    10 to 30 weight percent of a brominated polycarbonate different from the polycarbonate;
    0.5 to 5 weight percent of a poly(carbonate-siloxane) comprising 30 to 70 weight percent of siloxane blocks;
    1 to 10 weight percent of the core-shell silicone-(meth)acrylate impact modifier comprising a silicone elastomer core and a (meth)acrylate copolymer shell; and
    0.5 to 5 weight percent of the alkenyl aromatic-olefin block copolymer impact modifier;
    wherein the weight percent of each component is based on the total weight of the composition, which totals 100 weight percent.

4. The composition of claim 1, further comprising 0.01 to 2 weight percent of an anti-drip agent.

5. The composition of claim 1, comprising 2 to 3 weight percent of an alkenyl aromatic-olefin block copolymer impact modifier, based on the total weight of the composition.

6. The composition of claim 1, having at least one of the following properties:
    a molded sample of the composition retains at least 90 percent Mw after 336 hours in a hydrolytic chamber at 85° C. and 85 percent relative humidity;
    a molded sample of the composition retains greater than 85 percent Mw after 692 hours in a hydrolytic chamber at 85° C. and 85 percent relative humidity; or
    a molded sample of the composition retains greater than 75 percent Mw after 1000 hours in a hydrolytic chamber at 85° C. and 85% relative humidity.

7. The composition of claim 1, having at least one of the following properties:
    a molded sample of the composition retains at least 80 percent notched Izod impact strength measured at 23° C. according to ASTM D256 after 336 hours in a hydrolytic chamber at 85° C. and 85 percent relative humidity,
    molded sample of the composition retains at least 65 percent notched Izod impact strength measured at 23° C. according to ASTM D256 after 692 hours in a hydrolytic chamber at 85° C. and 85 percent relative humidity; or
    a molded sample of the composition retains at least 50 percent notched Izod impact strength measured at 23° C. according to ASTM D256 after 1000 hours in a hydrolytic chamber at 85° C. and 85 percent relative humidity.

8. The composition of claim 1, wherein a molded sample of the composition having a thickness of 3.2 millimeters has at least one of the following properties:
    a notched Izod impact strength of greater than 500 Joules/meter and a ductility of 100% measured according to ASTM D256 at a temperature of −30° C.; or
    a notched Izod impact strength of greater than 500 Joules/meter and a ductility of 100% measured according to ASTM D256 at a temperature of −40° C.

9. The composition of claim 1, wherein a molded sample of the composition having a thickness of 0.8 millimeters has a UL94 flame retardance rating of V0.

10. The composition of claim 1,
wherein the polycarbonate comprises a bisphenol A homopolycarbonate.

11. The composition of claim 1, wherein the core-shell silicone-(meth) is a dimethylsiloxane-methyl methacrylate copolymer having a particle size of 200 to 400 nanometer or a particle size of greater than 400 nanometer.

12. The composition of claim 1, wherein a molded sample of the composition having a thickness of 3.2 millimeters has at least one of
a notched Izod impact strength of greater than 600 Joules/meter and a ductility of 100% measured according to ASTM D256 at a temperature of −30° C; or
a UL94 flame retardance rating of V0.

13. The composition of claim 1, wherein the core-shell silicone-(meth) is a dimethylsiloxane-methyl methacrylate copolymer, present in an amount of 1 to 5 weight percent, based on the total weight of the composition.

14. The composition of claim 1, comprising:
65 to 75 weight percent of a polycarbonate, wherein the polycarbonate comprises a first bisphenol A homopolycarbonate having a weight average molecular weight of 21,000 to 23,000 Daltons and a second bisphenol A homopolycarbonate having a weight average molecular weight of 29,900 to 31,000 Daltons;
15 to 25 weight percent of a brominated bisphenol A polycarbonate;
0.8 to 3 weight percent of a poly(bisphenol A carbonate-dimethylsiloxane) comprising 30 to 70 weight percent of dimethylsiloxane blocks;
3 to 5 weight percent of a core-shell dimethylsiloxane-methyl methacrylate impact modifier;
1 to 5 weight percent of a styrene-ethylene/butylene-styrene block copolymer impact modifier;
0.1 to 0.5 weight percent of a poly(tetrafluoroethylene)-encapsulated styrene-acrylonitrile; and
0.1 to 3 weight percent of a combination of a colorant, a mold release agent, a heat stabilizer, and an ultraviolet light stabilizer.

15. The composition of claim 14, wherein a molded sample of the composition does not show tracking after at least 50 drops of an aqueous 0.1% ammonium chloride solution measured at 600 V as determined by ASTM D-3638-85;
a molded sample of the composition having a thickness of 3.2 millimeters has a notched Izod impact strength of greater than 500 Joules/meter and a ductility of 100% measured according to ASTM D256 at a temperature of −30° C.;
a molded sample of the composition having a thickness of 3.2 millimeters has a tensile strength greater than or equal to 55 megapascal determined according to ASTM D638;
a molded sample of the composition having a thickness of 3.2 millimeters has a tensile modulus of greater than or equal to 2 gigapascal determined according to ASTM method D638; and
a molded sample of the composition having a thickness of 0.8 millimeters has a UL94 flame retardance rating of V0.

16. The composition of 14, wherein a molded sample of the composition does not show tracking after at least 50 drops of an aqueous 0.1% ammonium chloride solution measured at 600 V as determined by ASTM D-3638-85.

17. The composition of claim 14, wherein the brominated polycarbonate comprises brominated bisphenol A having a bromine content of 24 to 27.5 weight percent, relative to the total weight of the brominated polycarbonate.

18. The composition of claim 4, wherein the poly(bisphenol A carbonate-dimethyl siloxane) has
carbonate blocks having a glass transition temperature greater than 70° C. and siloxane blocks having a glass transition temperature of minus 130 to minus 50° C.
a weight average molecular weight of 10,000 to 100,000 Daltons;
at least 30% elongation before yield as measured by ASTM D638; and
a Shore D hardness of 5 to 20 as measured by ASTM D2240.

19. An article comprising the composition of claim 1, wherein
the article is a molded article, a thermoformed article, an extruded film, an extruded sheet, one or more layers of a multi-layer article, a substrate for a coated article, or a substrate for a metallized article.

20. The article of claim 19, wherein the article is a solar apparatus, an electrical junction box, an electrical connector, an electrical vehicle charger, an outdoor electrical enclosure, a smart meter enclosure, a smart grid power node, a photovoltaic frame, or a miniature circuit breaker.

* * * * *